United States Patent
Islam

(10) Patent No.: US 6,885,498 B2
(45) Date of Patent: Apr. 26, 2005

(54) MULTI-STAGE OPTICAL AMPLIFIER AND BROADBAND COMMUNICATION SYSTEM

(75) Inventor: Mohammed N. Islam, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 133 days.

(21) Appl. No.: 10/014,839

(22) Filed: Dec. 10, 2001

(65) Prior Publication Data

US 2002/0101649 A1 Aug. 1, 2002

Related U.S. Application Data

(63) Continuation-in-part of application No. 09/719,591, filed on Dec. 12, 2000, and a continuation-in-part of application No. 09/471,753, filed on Dec. 23, 1999, now Pat. No. 6,359,725, and a continuation-in-part of application No. 09/471,747, filed on Dec. 23, 1999, now Pat. No. 6,335,820.

(60) Provisional application No. 60/089,426, filed on Jun. 16, 1998.

(51) Int. Cl.$^7$ ............................................. H01S 3/00
(52) U.S. Cl. ....................................................... 359/334
(58) Field of Search ......................................... 359/334

(56) References Cited

U.S. PATENT DOCUMENTS

| | | | |
|---|---|---|---|
| 4,063,106 A | 12/1977 | Ashkin et al. ............. 307/88.3 |
| 4,616,898 A | 10/1986 | Hicks, Jr. ................. 350/96.15 |
| 4,685,107 A | 8/1987 | Kafka et al. ................... 372/6 |
| 4,699,452 A | 10/1987 | Mollenauer et al. ..... 350/96.16 |
| 4,715,679 A | 12/1987 | Bhagavatula ............ 350/96.33 |
| 4,740,974 A | 4/1988 | Byron ............................ 372/3 |
| 4,831,616 A | 5/1989 | Huber ........................... 370/3 |
| 4,932,739 A | 6/1990 | Islam ..................... 350/96.15 |
| 4,995,690 A | 2/1991 | Islam ..................... 350/96.15 |
| 5,020,050 A | 5/1991 | Islam ............................ 370/4 |
| 5,039,199 A | 8/1991 | Mollenauer et al. ........ 359/334 |
| 5,050,183 A | 9/1991 | Duling, III .................... 372/94 |
| 5,058,974 A | 10/1991 | Mollenauer .................. 385/27 |
| 5,078,464 A | 1/1992 | Islam .......................... 385/122 |
| 5,101,456 A | 3/1992 | Islam ........................... 385/27 |

(Continued)

FOREIGN PATENT DOCUMENTS

| | | | |
|---|---|---|---|
| EP | 0 421 675 A2 | 4/1991 | ........... H04B/10/16 |
| EP | 0 841 764 A2 | 5/1998 | ........... H04B/10/24 |
| EP | 0 903 876 A1 | 3/1999 | ........... H04B/10/17 |
| EP | 0 90 3 877 A2 | 3/1999 | ........... H04B/10/18 |
| EP | 0 936 761 A1 | 8/1999 | ........... H04B/10/18 |

(Continued)

OTHER PUBLICATIONS

Agrawal, Govind. Fiber–Optic Communication Systems. 2nd Edition. John Wiley & Sons, Inc. 1997. pp. 380–383.*

(Continued)

Primary Examiner—Thomas G. Black
Assistant Examiner—Deandra M. Hughes
(74) Attorney, Agent, or Firm—Baker Botts L.L.P.

(57) ABSTRACT

A multi-stage optical amplifier includes at least a distributed Raman amplifier fiber and a discrete amplifier fiber. The amplifier is configured to be coupled to at least one signal source that produces a plurality of signal wavelengths $\lambda_s$; and at least a first pump source that produces one or more pump beam wavelengths $\lambda_p$. A signal input port is coupled to the amplifier. A signal output port is coupled to the amplifier. The distributed Raman and discrete amplifier fibers are positioned between the signal input port and the signal output port. A first pump input port is coupled to a first end of the distributed Raman amplifier fiber. A second pump input port is coupled to a second end of the distributed Raman amplifier fiber. The first end is located closer to the signal input port than the second end. A third pump input port is coupled to the discrete amplifier fiber.

102 Claims, 12 Drawing Sheets

U.S. PATENT DOCUMENTS

| | | | | |
|---|---|---|---|---|
| 5,107,360 | A | 4/1992 | Huber | 359/124 |
| 5,115,488 | A | 5/1992 | Islam et al. | 385/129 |
| 5,117,196 | A | 5/1992 | Epworth et al. | 359/333 |
| 5,132,976 | A | 7/1992 | Chung et al. | 372/6 |
| 5,134,620 | A | 7/1992 | Huber | 372/6 |
| 5,140,456 | A | 8/1992 | Huber | 359/341 |
| 5,151,908 | A | 9/1992 | Huber | 372/6 |
| 5,153,762 | A | 10/1992 | Huber | 359/125 |
| 5,159,601 | A | 10/1992 | Huber | 372/6 |
| 5,166,821 | A | 11/1992 | Huber | 359/238 |
| 5,187,760 | A | 2/1993 | Huber | 385/37 |
| 5,191,586 | A | 3/1993 | Huber | 382/6 |
| 5,191,628 | A | 3/1993 | Byron | 385/27 |
| 5,200,964 | A | 4/1993 | Huber | 372/26 |
| 5,208,819 | A | 5/1993 | Huber | 372/32 |
| 5,210,631 | A | 5/1993 | Huber et al. | 359/132 |
| 5,212,579 | A | 5/1993 | Huber et al. | 359/182 |
| 5,218,655 | A | 6/1993 | Mizrahi | 385/39 |
| 5,222,089 | A | 6/1993 | Huber | 372/26 |
| 5,224,194 | A | 6/1993 | Islam | 385/122 |
| 5,225,925 | A | 7/1993 | Grubb et al. | 359/341 |
| 5,226,049 | A | 7/1993 | Grubb | 372/6 |
| 5,243,609 | A | 9/1993 | Huber | 372/19 |
| 5,257,124 | A | 10/1993 | Glaab et al. | 359/124 |
| 5,268,910 | A | 12/1993 | Huber | 372/6 |
| 5,271,024 | A | 12/1993 | Huber | 372/6 |
| 5,283,686 | A | 2/1994 | Huber | 359/337 |
| 5,293,545 | A | 3/1994 | Huber | 359/111 |
| 5,295,016 | A | 3/1994 | Van Deventer | 359/347 |
| 5,295,209 | A | 3/1994 | Huber | 385/37 |
| 5,301,054 | A | 4/1994 | Huber et al. | 359/132 |
| 5,321,543 | A | 6/1994 | Huber | 359/187 |
| 5,321,707 | A | 6/1994 | Huber | 372/6 |
| 5,323,404 | A | 6/1994 | Grubb | 372/6 |
| 5,331,449 | A | 7/1994 | Huber et al. | 359/125 |
| 5,359,612 | A | 10/1994 | Dennis et al. | 372/18 |
| 5,369,519 | A | 11/1994 | Islam | 359/173 |
| 5,373,389 | A | 12/1994 | Huber | 359/195 |
| 5,389,779 | A | 2/1995 | Betzig et al. | 250/216 |
| 5,400,166 | A | 3/1995 | Huber | 359/173 |
| 5,416,629 | A | 5/1995 | Huber | 359/182 |
| 5,450,427 | A | 9/1995 | Fermann et al. | 372/18 |
| 5,467,212 | A | 11/1995 | Huber | 359/168 |
| 5,473,622 | A | 12/1995 | Grubb | 372/6 |
| 5,477,555 | A | 12/1995 | Debeau et al. | 372/25 |
| 5,479,291 | A | 12/1995 | Smith et al. | 359/333 |
| 5,485,481 | A | 1/1996 | Ventrudo et al. | 372/6 |
| 5,485,536 | A | 1/1996 | Islam | 385/31 |
| 5,497,386 | A | 3/1996 | Fontana | 372/18 |
| 5,504,609 | A | 4/1996 | Alexander et al. | 359/125 |
| 5,504,771 | A | 4/1996 | Vahala et al. | 372/94 |
| 5,513,194 | A | 4/1996 | Tamura et al. | 372/6 |
| 5,521,738 | A | 5/1996 | Froberg et al. | 359/184 |
| 5,530,710 | A | 6/1996 | Grubb | 372/6 |
| 5,532,864 | A | 7/1996 | Alexander et al. | 359/177 |
| 5,541,947 | A | 7/1996 | Mourou et al. | 372/25 |
| 5,542,011 | A | 7/1996 | Robinson | 385/24 |
| 5,555,118 | A | 9/1996 | Huber | 359/125 |
| 5,557,442 | A | 9/1996 | Huber | 359/179 |
| 5,559,920 | A | 9/1996 | Chraplyvy et al. | 385/123 |
| 5,577,057 | A | 11/1996 | Frisken | 372/18 |
| 5,579,143 | A | 11/1996 | Huber | 359/130 |
| 5,600,473 | A | 2/1997 | Huber | 359/179 |
| 5,617,434 | A | 4/1997 | Tamura et al. | 372/6 |
| 5,623,508 | A | 4/1997 | Grubb et al. | 372/3 |
| 5,629,795 | A | 5/1997 | Suzuki et al. | 359/337 |
| 5,659,351 | A | 8/1997 | Huber | 348/7 |
| 5,659,559 | A | 8/1997 | Ventrudo et al. | 372/6 |
| 5,659,644 | A | 8/1997 | DiGiovanni et al. | 385/31 |
| 5,664,036 | A | 9/1997 | Islam | 385/31 |
| 5,673,280 | A | 9/1997 | Grubb et al. | 372/3 |
| 5,673,281 | A | 9/1997 | Byer | 372/3 |
| 5,701,186 | A | 12/1997 | Huber | 359/125 |
| 5,726,784 | A | 3/1998 | Alexander et al. | 359/125 |
| 5,734,665 | A | 3/1998 | Jeon et al. | 372/6 |
| 5,757,541 | A | 5/1998 | Fidric | 359/341 |
| 5,768,012 | A | 6/1998 | Zanoni et al. | 359/341 |
| 5,778,014 | A | 7/1998 | Islam | 372/6 |
| 5,790,300 | A | 8/1998 | Zediker et al. | 359/334 |
| 5,796,909 | A | 8/1998 | Islam | 385/147 |
| 5,798,855 | A | 8/1998 | Alexander et al. | 359/177 |
| 5,815,518 | A | 9/1998 | Reed et al. | 372/6 |
| 5,825,520 | A | 10/1998 | Huber | 359/130 |
| 5,831,754 | A | 11/1998 | Nakano | 359/161 |
| 5,838,700 | A | 11/1998 | Dianov et al. | 372/6 |
| 5,841,797 | A | 11/1998 | Ventrudo et al. | 372/6 |
| 5,847,862 | A | 12/1998 | Chraplyvy et al. | 359/337 |
| 5,861,981 | A | 1/1999 | Jabr | 359/341 |
| 5,880,866 | A | 3/1999 | Stolen | 359/138 |
| 5,883,736 | A | 3/1999 | Oshima et al. | 359/341 |
| 5,887,093 | A | 3/1999 | Hansen et al. | 385/27 |
| 5,905,838 | A | 5/1999 | Judy et al. | 385/123 |
| 5,920,423 | A | 7/1999 | Grubb et al. | 359/341 |
| 5,959,750 | A | 9/1999 | Eskildsen et al. | 359/134 |
| 5,978,130 | A | 11/1999 | Fee et al. | 359/341 |
| 6,008,933 | A | 12/1999 | Grubb et al. | 359/341 |
| 6,043,927 | A | 3/2000 | Islam | 359/332 |
| 6,052,393 | A | 4/2000 | Islam | 372/6 |
| 6,081,366 | A | 6/2000 | Kidorf et al. | 359/341 |
| 6,088,152 | A | 7/2000 | Berger et al. | 359/334 |
| 6,101,024 | A | 8/2000 | Islam et al. | 359/334 |
| 6,147,794 | A | 11/2000 | Stentz | 359/334 |
| 6,151,160 | A | 11/2000 | Ma et al. | 359/341 |
| 6,163,636 | A | 12/2000 | Stentz et al. | 385/24 |
| 6,181,464 | B1 | 1/2001 | Kidorf et al. | 359/334 |
| 6,191,854 | B1 | 2/2001 | Grasso et al. | 359/124 |
| 6,191,877 | B1 | 2/2001 | Chraplyvy et al. | 359/124 |
| 6,204,960 | B1 | 3/2001 | Desurvire | 359/341 |
| 6,219,176 | B1 | 4/2001 | Terahara | 359/341 |
| 6,236,496 | B1 | 5/2001 | Yamada et al. | 359/341 |
| 6,239,902 | B1 | 5/2001 | Islam et al. | 359/334 |
| 6,239,903 | B1 | 5/2001 | Islam et al. | 359/337 |
| 6,263,139 | B1 | 7/2001 | Kawakami et al. | 385/123 |
| 6,310,716 | B1 | 10/2001 | Evans et al. | 359/334 |
| 6,335,820 | B1 | 1/2002 | Islam | 359/334 |
| 6,342,965 | B1 | 1/2002 | Kinoshita | 359/334 |
| 6,344,922 | B1 | 2/2002 | Grubb et al. | 359/334 |
| 6,356,383 | B1 | 3/2002 | Cornwell, Jr. et al. | 359/334 |
| 6,356,384 | B1 | 3/2002 | Islam | 359/334 |
| 6,359,725 | B1 | 3/2002 | Islam | 359/334 |
| 6,370,164 | B1 | 4/2002 | Islam | 372/6 |
| 6,374,006 | B1 | 4/2002 | Islam et al. | 385/15 |
| 6,381,391 | B1 | 4/2002 | Islam et al. | 385/123 |
| 6,404,964 | B1 | 6/2002 | Bhagavatula et al. | 385/123 |
| 6,414,786 | B1 | 7/2002 | Foursa | 359/334 |
| 6,417,959 | B1 | 7/2002 | Bolshtyansky et al. | 359/334 |
| 6,433,921 | B1 | 8/2002 | Wu et al. | 359/334 |
| 6,437,906 | B1 | 8/2002 | Di Pasquale et al. | 359/337.2 |
| 6,456,426 | B1 * | 9/2002 | Bolshtyansky et al. | 359/334 |
| 6,525,869 | B1 * | 2/2003 | Thomas et al. | 359/334 |
| 6,529,315 | B1 * | 3/2003 | Bartolini et al. | 359/334 |
| 2002/0001123 | A1 | 1/2002 | Miyakawa et al. | 359/334 |

FOREIGN PATENT DOCUMENTS

| | | | | |
|---|---|---|---|---|
| EP | 1 054 489 | A2 | 11/2000 | |
| EP | 1 180 860 | A1 | 2/2001 | H04B/10/17 |
| FR | 2 764 452 | A1 | 12/1998 | H04J/14/02 |
| JP | 0 9 197452 | A | 7/1997 | G02F/1/35 |
| WO | WO 98/20587 | | 5/1998 | H01S/3/30 |
| WO | 99/66607 | A2 | 12/1999 | |
| WO | 00/49721 | A2 | 8/2000 | |

| WO | WO 02/17518 A1 | 2/2002 | ............ H04B/10/17 |

OTHER PUBLICATIONS

Hiroji Masuda and Shingo Kawal, Ultra Wide–Band Raman Amplification With A Total Gain–Bandwidth of 132 nm Of Two Gain–Bands Around 1.5µm, ECOC '99, Nice, France, pp. II–146–II–147, Sep. 26–30, 1999.

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53, 2001.

Vasilyev, et al., Pump intensity noise and ASE spectrum of Ramam amplification in non–zero dispersion–shifted fibers, reprinted from the Optical Amplifiers and Their Applications Conference, 2001 Technical Digest, 2001 Optical Society of America, pp. 57–59, 2001.

Hansen et al., "Repeaterless transmission experiment employing dispersion," 21st European Conference on Optical Communication, vol. 2, 1 page, Sep. 17–21, 1995.

Nissov et al., "100 Gb/s (10×10Gb/s) WDM Transmission Over 7200 km Using Distributed Raman Amplification," European Conference on Optical Communications, paper PD–9, pp. 9–12, Sep. 1997.

Hansen et al.; "Loss compensation in dispersion compensating fiber modules by Raman amplification," Optical Fiber Conference OFC'98, paper TuD1, Technical Digest, San Jose, CA, pp. 20–21, Feb. 1998.

Lee et al., "Bidirectional transmission of 40 Gbit/s WDM signal over 100km dispersion shifted fibre," Electronics Letters, vol. 34, No. 3, pp. 294–295, Feb. 5, 1998.

Okuno et al., "Generation of Ultra–Broad–Band Supercontinuum by Dispersion–Flattened and Decreasing Fiber," IEEE Photonics Technology Letters, vol. 10, No. 1, pp. 72–74, Jan. 1998.

Masuda et al., "Ultrawide 75–nm 3–dB Gain–Band Optical Amplification with Erbium–Doped Fluoride Fiber Amplifiers and Distributed Raman Amplifiers,", IEEE Photonics Technology Letters, vol. 10, No. 4, pp. 516–518, Apr. 1998.

Emori et al., "Less than 4.7 dB Noise Figure Broadband In–line EDFA with A Raman Amplified–1300 ps/nm DCF Pumped by Multi–channel WDM Laser Diodes," OSA Conference, paper PD3–1–5, Vail, CO, Jul. 1998.

Rotwitt et al., "Distributed Raman Amplifiers for Long Haul Transmission systems," LEOS, pp. 251–252, Dec. 1998.

Grubb et al., "Detailed analysis of Raman amplifiers for long–haul transmission," OFC Technical Digest, pp. 30–31, 1998.

Kawai et al., "Ultrawide, 75–nm 3–dB gain–band optical amplifier utilizing erium–doped fluoride fiber and Raman fiber," OFC Technical Digest, pp. 32–34, 1998.

Becker et al., "Erbium Doped Fiber Amplifiers Fundamentals and Technology," Academic Press, pp. 55–60, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Nissov et al, "Rayleigh crosstalk in long cascades of distributed unsaturated Raman amplifiers," Electronics Letters, vol. 35, No. 12, pp. 997–998, Jun. 10, 1999.

Kawai, et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Mikkelsen et al., "160 Gb/s TDM Transmission Systems," ECOC, 4 pages, 2000.

Nielsen et al., "3.28 Tb/s (82×40 Gb/s) transmission over 3× 100 km nonzero–dispersion fiber using dual C– and L–band hybrid Raman/Erbium–doped inline amplifiers," OFCC 2000, pp. 1229–1231, Mar. 7–Oct. 2000.

Seo et al., "Compensation of Raman–Induced Crosstalk Using a Lumped Germanosilicate Fiber Raman Amplifier in the 1.571–1.591–µm Region," IEEE Photonics Technology Letters, vol. 13, No. 1, pp. 28–30, Jan. 2001.

Pending patent application; USSN 09/811,067, entitled "Method and System for Reducing Degradation of Optical Signal to Noise Ratio", Filed Mar. 16, 2001.

Pending patent application; USSN 09/811,103; entitled "System and Method for Wide Band Raman Amplification", Filed Mar. 16, 2001.

Pending patent application; USSN 09/916,454; entitled "System and Method for Controlling Noise Figure", Filed Jul. 27, 2001.

Pending Provisional patent application; USSN 60/310,147; entitled "Combined Laser Diode Raman Pumps; Active Gain Equalizers; Bi–Directional Raman Amplifiers", Filed May, 2002.

Pending patent application; USSN 10/100,588; entitled "Electro–Absorption Based Modulation", Filed Mar. 15, 2002.

Pending patent application, USSN 09/768,367, entitled "All Band Amplifier", Filed Jan. 22, 2001.

Pending patent application: USSN 09/766,489; entitled "Nonlinear Polarization Amplifiers in Nonzero Dispersion Shifted Fiber", Filed Jan. 19, 2001.

Pending patent application; USSN 09/800,085; entitled "Dispersion Compensating Nonlinear Polarization Amplifier", Filed Mar. 5, 2001.

Pending patent application; USSN 09/719,591; entitled "Fiber–Optic Compensation for Dispersion, Gain Tilt, and Band Pump Nonlinearity", Filed Jun. 16, 1999.

Pending patent application; USSN 09/760,201; entitled "Low–Noise Distributed Raman Amplifier Using Bi–Directional Pumping Using Multiple Raman Orders", Filed Jan. 12, 2001.

Pending patent application; USSN 09/765,972; entitled "S+ Band Nonlinear Polarization Amplifiers", Filed Jan. 19, 2001.

Pending patent application; USSN 10/003,199; entitled "Broadband Amplifier and Communication System", Filed Oct. 30, 2001.

Pending patent application; USSN 10/007,643; entitled "Multi–Stage Optical Amplifier and Broadband Communcation System", Filed Oct. 30, 2001.

Pending patent application; USSN 10/005,472; entitled "Multi–Stage Optical Amplifier and Broadband Communcation System", Filed Nov. 6, 2001.

Pending patent application; USSN 10/014,839; entitled "Multi–Stage Optical Amplifier and Broadband Communcation System", Filed Dec. 10, 2001.

Pending patent application; USSN 09/990,142; entitled "Broadband Amplifier and Communication System", Filed Nov. 20, 2001.

Sun et al., "80nm ultra–wideband erbium–doped silica fibre amplifier," Electronics Letters vol. 33, No. 23, pp. 1965–1967, Nov. 6, 1997.

Wysocki et al., "Broad–Band Erbium–Doped Fiber Amplifier Flattened Beyond 40 nm Using Long–Period Grating Filter," IEEE Photonics Technology Letters, vol. 9, No. 10, pp. 1343–1345, Oct. 10, 1997.

Liaw et al., "Passive Gain–Equalized Wide–Band Erbium–Doped Fiber Amplifier Using Samarium–Doped Fiber," IEEE Photonics Technology Letters, vol. 8, No. 7, pp. 879–881, Jul. 1996.

Yamada et al., "A Low–Noise and Gain–Flattened Amplifier Composed of a Silica–Based and a Fluoride–Based $Er^{3+}$–Doped Fiber Amplifier in a Cascade Configuration," IEEE Photonics Technology Letters, vol. 8, No. 5, pp. 620–622, May 1996.

Ma et al., "240–km Repeater Spacing in a 5280–km WDM System Experiment Using 8 $\chi$ 2.5 Gb/s NRZ Transmission," IEEE Photonics Technology Letters, vol. 10, No. 6, pp. 893–895, Jun. 1998.

Kawai, S. et al., "Ultra–Wide, 75–nm 3–dB gain–Band Optical Amplifier Utilising Gain–Flattened Erbium–Doped Fluoride Fibre Amplifier and Discrete Raman Amplification," Electronics Letters, vol. 34, No. 9, pp. 897–898, Apr. 30, 1998.

Kidorf et al., Pump Interactions in a 100–nm Bandwidth Raman Amplifier, IEEE Photonics Technology Letters, vol. 11, No. 5, pp. 530–532, May 1999.

Ono et al., "Gain–Flattened $Er^{3+}$–Doped Fiber Amplifier for a WDM Signal in the 1.57–1.60–$\mu$m Wavelength Region," IEEE Photonics Technology Letters, vol. 9, No. 5, pp. 596–598, May 1997.

Hansen et al., "529km unrepeatered transmission at 2.488 GBit/s using dispersion compensation, forward error correction, and remote post–and pre–amplifiers pumped by diode–pumped Raman lasers," IEEE Electronics Letters, Online No. 19951043, Jul. 7, 1998.

Guy et al., "Lossless Transmission of 2ps Pulses Over 45km of Standard Fibre at 1.3 $\mu$m Using Distributed Raman Amplification," Electronics Letters, vol. 34, No. 8, pp. 793–794, Apr. 6, 1998.

Dianov et al., "Highly efficient 1.3 $\mu$m Raman fibre amplifier," Electronics Letters, vol. 34, No. 7, pp. 669–670, Apr. 2, 1998.

Chernikov et al., "Raman Fibre Laser Operating at 1.24 $\mu$m," Electronics Letters, vol. 34, No. 7,2 pages, Apr. 2, 1998.

Masuda et al., "Wideband, Gain–Flattened, Erbium–Doped Fibre Amplifiers with 3dB Bandwidths of >50nm," Electronics Letters, vol. 33, No. 12, pp. 1070–1072, Jun. 5, 1997.

Yang et al., "Demonstration of Two–Pump Fibre Optical Parametric Amplification," Electronics Letters, vol. 33, No. 21, pp. 1812–1813, Oct. 9, 1997.

Paschotta et al., "Ytterbium–Doped Fiber Amplifiers," IEEE Journal of Quantum Electronics, vol. 33, No. 7, pp. 1049–1056, Jul. 1997.

Grubb, S.G. et al., "Fiber Raman Lasers Emit at Many Wavelengths," Laser Focus World, pp. 127–134, Feb. 1996.

Mollenauer, L.F. et al., "Dispersion–Managed Solutions for Terrestrial Transmission," Optical Society of America, 0146–9592/99/050285–03, Rec'd Oct. 28, 1998.

Hansen, S.L. et al., "Gain Limit in Erbium–Doped Fiber Amplifiers Due to Internal Rayleigh Backscattering," IEEE Photonics Technology Letters, vol. 4, No. 6, pp. 559–661, Jun. 1992.

Spirit et al., "Systems Aspects of Raman Fibre Amplifiers," Optical Amplifiers for Communication, IEEE Proceedings, vol. 137, Pt. J, No. 4, pp. 221–224, Aug. 1990.

Mollenauer et al., "Soliton Propagation in Long Fibers with Periodically Compensated Loss," IEEE Journal of Quantum Electronics, vol. QE–22, No. 1, pp. 157–173, Jan. 1986.

Hansen et al., "Rayleigh Scattering Limitations in Distributed Raman Pre–Amplifiers," IEEE Photonics Technology Letters, vol. 10, No. 1, pp. 159–161, Jan. 1998.

Marhic, M.E. et al., "Cancellation of Stimulated–Raman–Scattering Cross Talk in Wavelength–Division–Multiplexed Optical Communication Systems by Series or Parallel Techniques," Optical Society of America, vol. 15, No. 3, pp. 958–963, Mar. 1998.

Ikeda, M., "Stimulated Raman Amplification Characteristics in Long Span Single–Mode Silica Fibers," Optics Communications, vol. 39, No. 3, pp. 148–152, Jun. 15, 1981.

Chraplyvy, et al., "Performance Degradation due to Stimulated Raman Scattering in Wavelength–Division–Multiplexed Optical–Fibre Systems," Electronics Letters, vol. 19, No. 16, pp. 651–643, Aug. 4, 1983.

Grandpierre et al., "Theory of Stimulated Raman Scattering Cancellation in Wavelength–Division–Multiplexed Systems via Spectral Inversion," IEEE Photonics Technology Letters, vol. 11, No. 10, pp. 1271–1273, Oct. 1999.

Chinn, "Analysis of Counter–Pumped Small–Signal Fibre Raman Amplifiers," Electronics Letters, vol. 33, No. 7, pp. 607–608, Mar. 27, 1997.

Stolen, R.H. et al., "Raman Gain in Glass Optical Waveguides," Appl. Phys. Lett., vol. 2, No. 6, pp. 276–278, Mar. 15, 1973.

Stolen, R.H. et al., "Development of the Stimulated Raman Spectrum in Single–Mode Silica Fibers," Optical Society of America, vol. 1, No. 4, pp. 662–667, Aug. 1984.

Takachio, N. et al., "32$\chi$10 Gb/s Distributed Raman Amplification Transmission with 50–GHz Channel Spacing in the Zero–Dispersion Region over 640km of 1.55–$\mu$m Dispersion–shifted Fiber," NTT Network Innovation Laboratories, 12 pages, (OFC) 1999.

Dianov, "Raman fiber amplifiers," Fiber Optics Research Center at the General Physics Institute of the Russian Academy of Sciences, Moscow, Russia, 5 pages © 1999.

Srivastava et al., "System Margin Enhancement with Raman Gain in Multi–Span WDM Transmission," Technical Digest, OFC '99, 3 pages, Feb. 26, 1999.

S.A.E. Lewis, et al., "1.4W Saturated Output Power from a Fibre Raman Amplifier," Femtosecond Optics Group, Physics Department, Imperial College, London, England, 114/WG5–1,3 pages, OFC 1999.

U.S. Appl. No. 10/100,591, "System and Method for Managing System Margin," Islam et al., pending Mar. 15, 2002.

U.S. Appl. No. 10/100,587, "Fiber Optic Transmission System with Low Cost Transmitter Compensation," Islam, pending, Mar. 15, 2002.

U.S. Appl. No. 10/116,487, "Fiber Optic Transmission System for a Metropolitan Area Network," Islam, pending, Apr. 3, 2002.

U.S. Appl. No. 10/100,589, "System and Method for Dispersion Compensation in an Optical Communication System," Islam et al., pending, Mar. 15, 2002.

U.S. Appl. No. 10/100,700, "Rack System for an End Terminal in an Optical Communication Network," Islam et al., pending, Mar. 15, 2002.

* cited by examiner

MULTI-STAGE OPTICAL AMPLIFIER AND BROADBAND COMMUNICATION SYSTEM

CROSS-REFERENCE TO RELATED APPLICATIONS

This application is a continuation-in-part of U.S. patent application Ser. No. 09/471,753, filed Dec. 23, 1999 now U.S. Pat. No. 6,359,725, which claims the benefit of U.S. Provisional Application Serial No. 60/089,426 filed Jun. 16, 1998 and a continuation-in-part of U.S. patent application Ser. No. 09/471,747, filed Dec. 23, 1999 now U.S. Pat. No. 6,335,828; and a continuation-in-part of U.S. patent application Ser. No. 09/719,591, filed Dec. 12, 2000, all of which are incorporated herein by reference.

BACKGROUND OF THE INVENTION

1. Field of the Invention

This invention relates generally to multi-stage optical amplifiers, and more particularly to broadband communication systems that include one or more multi-stage optical amplifiers.

2. Description of the Related Art

The demand for bandwidth continues to grow exponentially on fiber-optic superhighways due to applications such as data communications and the internet. Consequently, there is much effort at exploiting the bandwidth of optical fibers by using higher speeds per channel. Examples include time-division multiplexed systems-and wavelength-division multiplexing (WDM).

Most fiber-optic networks currently deployed use standard single-mode fiber or dispersion-shifted fiber (DSF). Standard fiber has a zero dispersion wavelength around 1310 nm, and the dispersion is primarily resulting from the inherent glass dispersion. Currently, most of the terrestrial network in the US and the world is based on standard fiber.

With DSF, waveguide dispersion is used to shift the zero dispersion wavelength to longer wavelengths. A conventional DSF has a zero dispersion wavelength at 1550 nm, coinciding with the minimum loss in a fused silica fiber. However, the zero dispersion wavelength can be shifted around by varying the amount of waveguide dispersion added. DSF is used exclusively in two countries, Japan and Italy, as well as in new long-haul links.

The limiting factors for a fiber-optic transmission line include loss, dispersion and gain equalization. Loss refers to the fact that the signal attenuates as it travels in a fiber due to intrinsic scattering, absorption and other extrinsic effects such as defects. Optical amplifiers can be used to compensate for the loss. Dispersion means that different frequencies of light travel at different speeds, and it comes from both the material properties and waveguiding effects. When using multi-wavelength systems, due to the nonconformity of the gain with frequency, gain equalization is required to even out the gain over the different wavelength channels.

The typical solution to overcoming these limitations is to periodically place in a transmission system elements to compensate for each of these problems. For example, a dispersion compensator can be used to cancel the dispersion, an optical amplifier used to balance the loss and a gain equalization element used to flatten the gain. Examples of dispersion compensators include chirped fiber gratings and dispersion compensating fiber (DCF). Examples of optical amplifiers include erbium-doped fiber amplifiers (EDFAs), Raman amplifiers, and non-linear fiber amplifiers (NLFAs).

Another problem that arises in WDM systems is interaction or cross-talk between channels through non-linearities in the fiber. In particular, four-wave mixing (4WM) causes exchange of energy between different wavelength channels, but 4WM only phase matches near the zero dispersion wavelength. Consequently, if a fiber link is made from conventional DSF, it is difficult to operate a WDM system from around 1540–1560 nm. This turns out to be quite unfortunate because typical EDFA's have gain from 1535–1565 nm, and the more uniform gain band is near 1540–1560 nm. A second fiber nonlinearity that can be troublesome is modulation instability (MI), which is 4WM where the fiber's nonlinear index-of-refraction helps to phase match. However, MI only phase matches when the dispersion is positive or in the so-called soliton regime. Therefore, MI can be avoided by operating at wavelengths shorter than the zero dispersion wavelength.

As the bandwidth utilization over individual fibers increases, the number of bands used for transmission increases. For WDM systems using a number of bands, additional complexities arise due to interaction between and amplification in multi-band scenarios. In particular, particular system designs are needed for Raman amplification in multi-band transmission systems. First, a new nonlinearity penalty arises from the gain tilt from the Raman effect between channels. This arises because long wavelength channels tend to rob energy from the short wavelength channels. Therefore, a means of minimizing the gain tilt on existing channels with the addition of new WDM channels is required.

To minimize both the effects of 4WM and Raman gain tilt, another technical strategy is to use distributed Raman amplification. In a WDM system with multi-bands, a complexity arises from interaction between the different pumps along the transmission line.

There is a need for multi-stage optical amplifiers and systems that have a distributed Raman amplification stage with bi-directional pumping There is a further need for multi-stage optical amplifiers and systems that have dispersion compensation over a broad bandwidth.

SUMMARY OF THE INVENTION

Accordingly, it is an object of the present invention to provide improved multi-stage optical amplifiers and systems.

Another object of the present invention is to provide multi-stage optical amplifiers and systems that have a distributed Raman amplification stage with bi-directional pumping.

Yet another object of the present invention is to provide multi-stage optical amplifiers and systems that have dispersion compensation over a broad bandwidth.

These and other objects of the present invention are achieved in a multi-stage optical amplifier that includes at least a distributed Raman amplifier fiber and a discrete amplifier fiber. The amplifier is configured to be coupled to at least one signal source that produces a plurality of signal wavelengths $\lambda_s$; and at least a first pump source that produces one or more pump beam wavelengths $\lambda_p$. A signal input port is coupled to the amplifier. A signal output port is coupled to the amplifier. The distributed Raman and discrete amplifier fibers are positioned between the signal input port and the signal output port. A first pump input port is coupled to a first end of the distributed Raman amplifier fiber. A second pump input port is coupled to a second end of the distributed Raman amplifier fiber. The first end is located closer to the signal input port than the second end. A third pump input port is coupled to the discrete amplifier fiber.

In another embodiment of the present invention, a multi-stage optical amplifier includes an optical fiber with at least a distributed Raman amplifier fiber and a discrete amplifier fiber. The optical fiber is configured to be coupled to at least one signal source that produces a plurality of signal wavelengths $\lambda_s$ and at least two pump sources that produce one or more pump beam wavelengths $\lambda_p$. At least a portion of one of the distributed Raman amplifier fiber and the discrete amplifier fiber is a dispersion compensating fiber. A signal input port is coupled to the optical fiber. A first pump input port is positioned between the signal input port and the distributed Raman amplifier fiber. A second pump input port is provided. The distributed Raman amplifier fiber is positioned between the signal input port and the second pump input port. The discrete amplifier fiber is positioned between the second pump input port and signal output port. A third pump input port is configured to pump the discrete Raman amplifier fiber.

In another embodiment of the present invention, a multi-stage optical amplifier includes an optical fiber with at least a distributed Raman amplifier fiber and a discrete amplifier fiber. The amplifier is configured to be coupled to at least one signal source that produces a plurality of signal wavelengths $\lambda_s$; and at least a first pump source that produces one or more pump beam wavelengths $\lambda_p$. A signal input port is coupled to the optical fiber. A signal output port is coupled to the optical fiber. The distributed Raman and discrete amplifier fibers are positioned between the signal input port and the signal output port. A first pump input port is coupled to the distributed Raman amplifier fiber. A second pump input port is coupled to the discrete amplifier fiber. A dispersion compensating member is coupled to the optical fiber. The dispersion compensating member has an opposite sign of dispersion slope and an opposite sign of dispersion relative to at least a portion of the optical fiber.

In another embodiment of the present invention, a multi-stage optical amplifier includes an optical fiber with a first Raman amplifier fiber and a second Raman amplifier fiber. The optical fiber is configured to be coupled to a signal source that produces a plurality of signal wavelengths $\lambda_s$ and a pump source that produces one or more pump wavelengths $\lambda_p$. The one or more pump wavelengths $\lambda_p$ are less than at least a portion of the plurality of signal wavelengths $\lambda_s$. A signal input port, a signal output port, a pump input port and a dispersion compensating member are coupled to the optical fiber. A pump shunt is coupled to the optical fiber. At least a portion of the one or more pump wavelengths $\lambda_p$ is coupled between the first Raman amplifier fiber and the second Raman amplifier fiber.

In another embodiment of the present invention, a multi-stage optical amplifier system includes a plurality of transmitters that produce a plurality of signal wavelengths $\lambda_s$. A multi-stage optical amplifier is provided and includes at least a distributed Raman amplifier fiber and a discrete amplifier fiber. The multi-stage optical amplifier is coupled to the plurality of transmitters and configured to be coupled to at least a first pump source that produces one or more pump beam wavelengths $\lambda_p$. A signal input port and a signal output port are coupled to the amplifier. The distributed Raman and discrete amplifier fibers are positioned between the signal input port and the signal output port. A first pump input port is coupled to a first end of the distributed Raman amplifier fiber. A second pump input port is coupled to a second end of the distributed Raman amplifier fiber. The first end is located closer to the signal input port than the second end. A third pump input port is coupled to the discrete amplifier fiber. A plurality of receivers are coupled to the multi-stage optical amplifier.

In another embodiment of the present invention, a multi-stage optical amplifier system includes a plurality of transmitters that produce a plurality of signal wavelengths $\lambda_s$, and a multi-stage optical amplifier. The multi-stage optical amplifier includes an optical fiber with at least a distributed Raman amplifier fiber and a discrete amplifier fiber. The multi-stage optical amplifier is coupled to the plurality of transmitters and configured to be coupled to at least two pump sources that produce one or more pump beam wavelengths $\lambda_p$. At least a portion of one of the distributed Raman amplifier fiber and the discrete amplifier fiber is a dispersion compensating fiber A signal input port is coupled to the optical fiber. A first pump input port is positioned between the signal input port and the distributed Raman amplifier fiber. The multi-stage optical amplifier also includes a second pump input port. The distributed Raman amplifier fiber is positioned between the signal input port and the second pump input port and the discrete amplifier fiber is positioned between the second pump input port and signal output port. A third pump input port is configured to pump the discrete Raman amplifier fiber. A plurality of receivers are coupled to the multi-stage optical amplifier.

In another embodiment of the present invention, a multi-stage optical amplifier system includes a plurality of transmitters that produce a plurality of signal wavelengths $\lambda_s$, and a multi-stage optical amplifier. The multi-stage optical amplifier has an optical fiber with at least a distributed Raman amplifier fiber and a discrete amplifier fiber. The multi-stage optical amplifier is coupled to the plurality of transmitters and configured to be coupled to at least a first pump source that produces one or more pump beam wavelengths $\lambda_p$. A signal input port is coupled to the optical fiber. A signal output port is coupled to the optical fiber. The distributed Raman and discrete amplifier fibers are positioned between the signal input port and the signal output port. A first pump input port is coupled to the distributed Raman amplifier fiber. A second pump input port is coupled to the discrete amplifier fiber. A dispersion compensating member is coupled to the optical fiber. The dispersion compensating member has an opposite sign of dispersion slope and an opposite sign of dispersion relative to at least a portion of the optical fiber. A plurality of receivers are coupled to the multi-stage optical amplifier.

In another embodiment of the present invention, a multi-stage optical amplifier system includes a plurality of transmitters that produce a plurality of signal wavelengths $\lambda_s$, and a multi-stage optical amplifier. The multi-stage optical amplifier has an optical fiber with a first Raman amplifier fiber and a second Raman amplifier fiber. The multi-stage optical amplifier is coupled to the plurality of transmitters and configured to be coupled to a pump source that produces one or more pump wavelengths $\lambda_p$. The one or more pump wavelengths $\lambda_p$ are less than at least a portion of the plurality of signal wavelengths $\lambda_s$. A signal input port, a signal output port, a pump input port, a dispersion compensating member and a pump shunt are coupled to the optical fiber. At least a portion of the one or more pump wavelengths $\lambda_p$ is coupled between the first Raman amplifier fiber and the second Raman amplifier fiber. A plurality of receivers are coupled to the multi-stage optical amplifier.

DETAILED DESCRIPTION OF PREFERRED EMBODIMENTS

Figure 1:
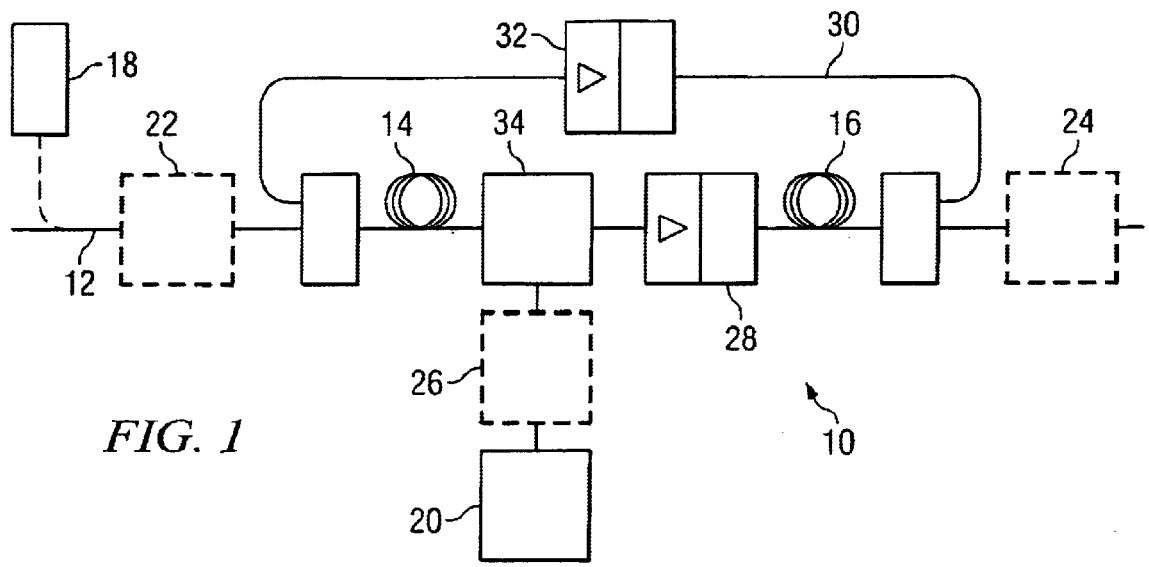
FIG. 1 is a schematic diagram of one embodiment of a multi-stage optical amplifier of the present invention that includes a pump shunt.

One embodiment of the present invention, as illustrated in FIG. 1, is a multi-stage optical amplifier 10 with an optical fiber 12 including a first amplifier fiber 14 and a second amplifier fiber 16. Optical fiber 12 is configured to be coupled to a signal source 18 that produces at least a signal wavelength $\lambda_s$ and a pump source 20 that produces a pump wavelength $\lambda_p$. Pump wavelength $\lambda_p$ is less than signal wavelength $\lambda_s$. Signal input port 22, signal output port 24 and pump input port 26 are each coupled to optical fiber 12. A first lossy member 28 is coupled to optical fiber 12 and positioned between the first and second amplifier fibers 14 and 16 respectively. A pump shunt 30 is coupled to signal input port 22 and signal output port 24. Optionally, a second lossy member 32 is coupled to pump shunt 30. Pump shunt 30 can be an optical fiber that is integral with optical fiber 12 or a separate optical fiber.

Pump beam $\lambda_p$ propagates towards signal input port 22 from first amplifier fiber 14 and away from signal input port 22 to second amplifier fiber 16.

First and second amplifier fibers 14 and 16 each preferably have a length greater than or equal to 200 m. Pump wavelength $\lambda_p$ is preferably in the range of 1300 nm to 1530 nm, and the signal wavelength can be in the range of 1430 to 1530 nm Suitable pump sources 20 include but are not limited to laser diodes (LD's), solid state lasers, fiber-based cascaded Raman wavelength shifters, cladding pumped fiber lasers and the like.

First lossy member 28 can be an optical isolator, an add/drop multiplexer. a gain equalization member, a dispersion compensation element and the like. One or both of first and second amplifier fibers 14 and 16 can be Raman amplifiers. Lossy elements 28 can also be placed before and after first and second amplifier fibers 14 and 16 to prevent disturbance of amplifier performance from spurious reflections from the transmission line. Additionally, a second lossy element 32 can be inserted into pump shunt 30 to reduce the multi-path interference of the signal beam in amplifiers 12 and 14.

Additionally, one or both of first and second amplifier fibers 14 and 16 can be implemented in dispersion compensating fiber (DCF). A DCF is a fiber whose zero dispersion point is shifted to wavelengths much longer than 1500 nm using the waveguide dispersion property. Consequently, DCF tend to have a small affective core area and significant germanium doping in the core, both of which lead to an enhancement of the Raman gain coefficient. DCF's are generally added periodically to a high-speed transmission link to compensate for the dispersion accumulated in the line.

In one embodiment, multi-stage optical amplifier 10 operates in a violet band between 1430 and 1530 nm. Fiber 12 is a DSF with at least one fiber non-linearity effect and a zero dispersion wavelength. In this embodiment, multi-stage optical amplifier 10 provides gain in the violet band sufficiently far from the zero dispersion wavelength to avoid non-linearity effects.

First amplifier fiber 14 preferably has lower noise than second amplifier fiber 16. Second amplifier fiber 16 has a higher gain than first amplifier fiber 14. In one embodiment, first amplifier fiber 14 has an optical noise figure of less than 8 dB, and second amplifier fiber 16 has a gain level of at least 5 dB.

One or more WDM couplers 34 are used to couple a pump path from the signal input port 22 to the signal output port 24. WDM couplers 34 are designed to pass (couple over) the signal band while coupling over (passing) the pump beams. Exemplary WDM couplers 34 include fused-tapered fiber couplers, Mach-Zehnder couplers, thin-film dielectric filters, bulk diachronic elements and the like.

Signal input port 22 inputs signal $\lambda_s$ which is amplified through Raman scattering when first and second amplifier fibers 14 and 16 are Raman amplifiers. The dispersion and length of the first and second amplifier fibers 14 and 16 can be selected to be of the same magnitude of dispersion-length product as the transmission link but of the opposite sign of dispersion. First and second amplifier fibers 14 and 16 are preferably made single spatial mode for pump source 20 and signal wavelengths by making the cut-off wavelength of the gain fiber shorter than the pump wavelength. In particular, the cut-off wavelength is the wavelength below which first and second amplifier fibers 14 and 16 support more than one mode or becomes multi-mode. If the pump or signal falls into the multi-mode region, then additional noise arising from the beating between different modes may arise.

Figure 2:
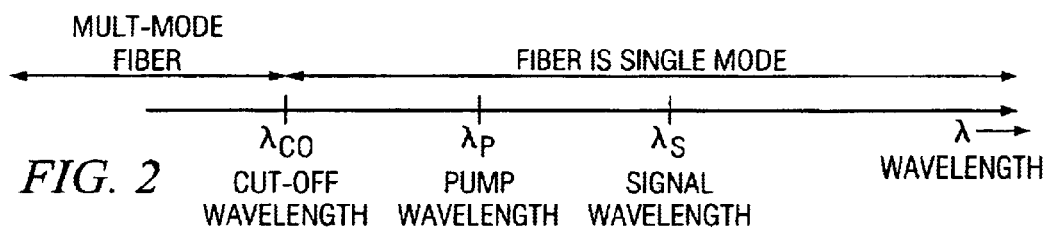
FIG. 2 illustrates that the cutoff wavelength of the fiber used with the present invention should be shorter than the pump and signal wavelengths.

As shown in FIG. 2 the fiber cut-off wavelength should be shorter than the pump wavelength $\lambda_p$. Pump wavelength $\lambda_p$ is shorter than signal wavelength $\lambda_s$. Multi-stage optical amplifier 10 is pumped so the net gain equals or exceeds the sum of losses in the transmission link and first and second amplifier fibers 14 and 16.

Figure 3:
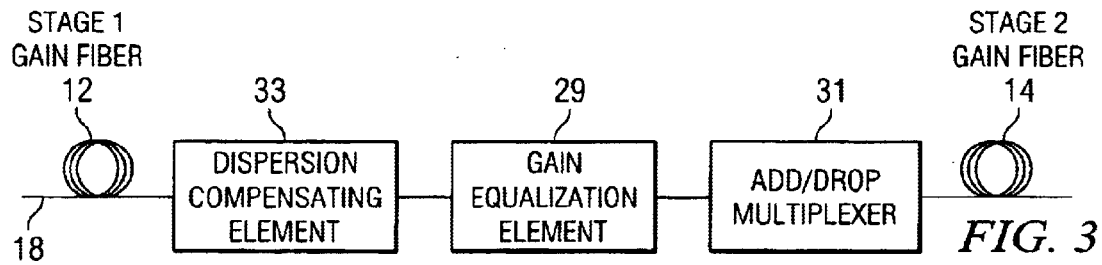
FIG. 3 is a schematic diagram illustrating the inclusion of a dispersion compensating element, a gain equalization element and an add/drop multiplexer to the multi-stage optical amplifier of the present invention.

FIG. 3 illustrates that a dispersion compensating element 33, gain equalization element 29 or an add/drop multiplexer 31 can be included and positioned between first and second amplifier fibers 14 and 16.

Figure 4:
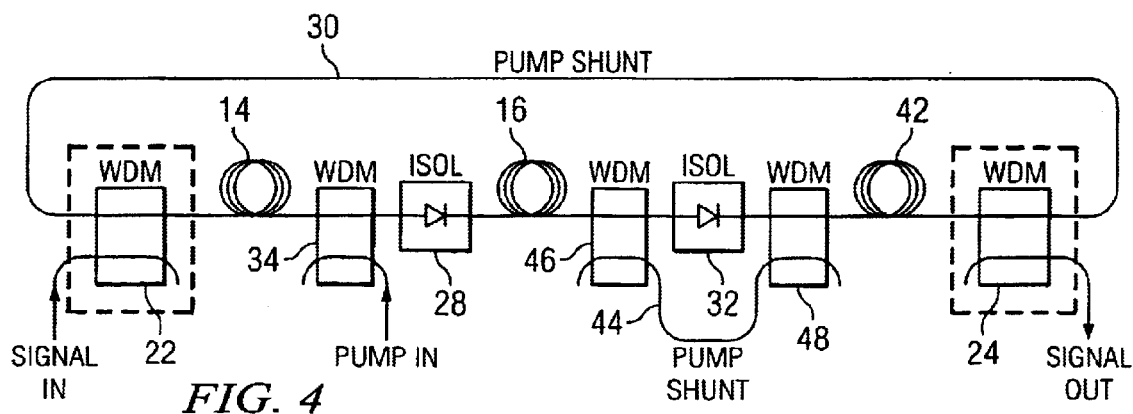
FIG. 4 is a schematic diagram of another embodiment of a multi-stage optical amplifier of the present invention that includes two pump shunts.

FIG. 4 illustrates an embodiment of multi-stage optical amplifier 10 with a third amplifier fiber 42. Second lossy member 32 is positioned between second and third amplifier fibers 16 and 42. A second pump shunt 44 is coupled to second and third WDM couplers 46 and 48. Additional amplifier fibers can also be included.

Figure 5:
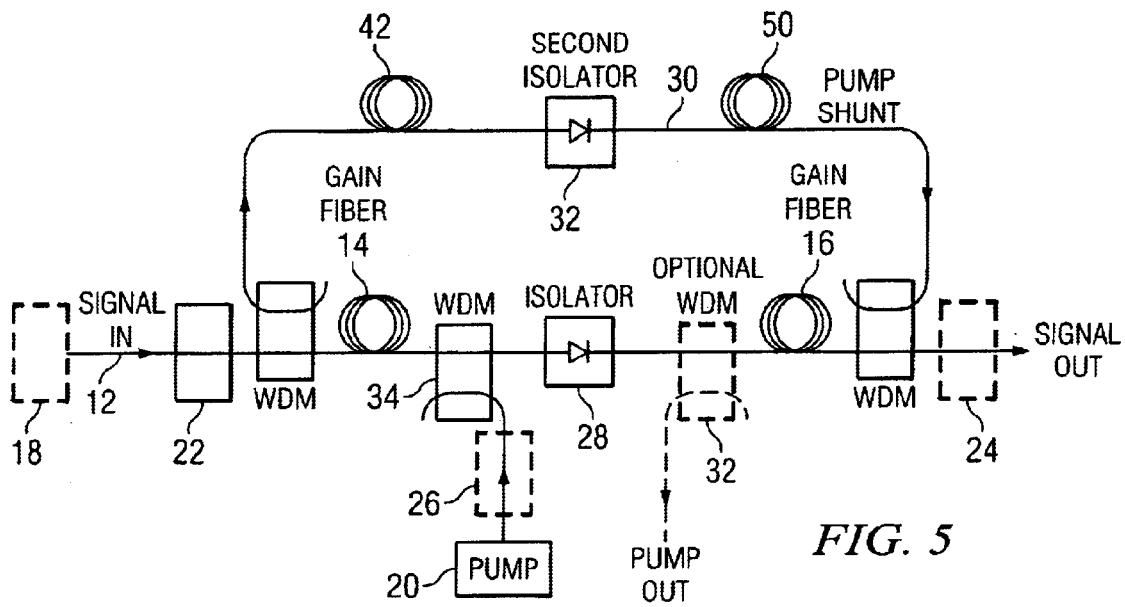
FIG. 5 is a schematic diagram of another embodiment of a multi-stage optical amplifier of the present invention that includes a pump shunt and four amplifier fibers.

As illustrated in FIG. 5, multi-stage optical amplifier 10 can include a third and a fourth amplifier fiber 42 and 50, respectively. In this embodiment, third and fourth amplifier fibers 42 and 50 are coupled to pump shunt 30. Second lossy member 32 is positioned between third and fourth amplifier fibers 42 and 50.

Figure 6:
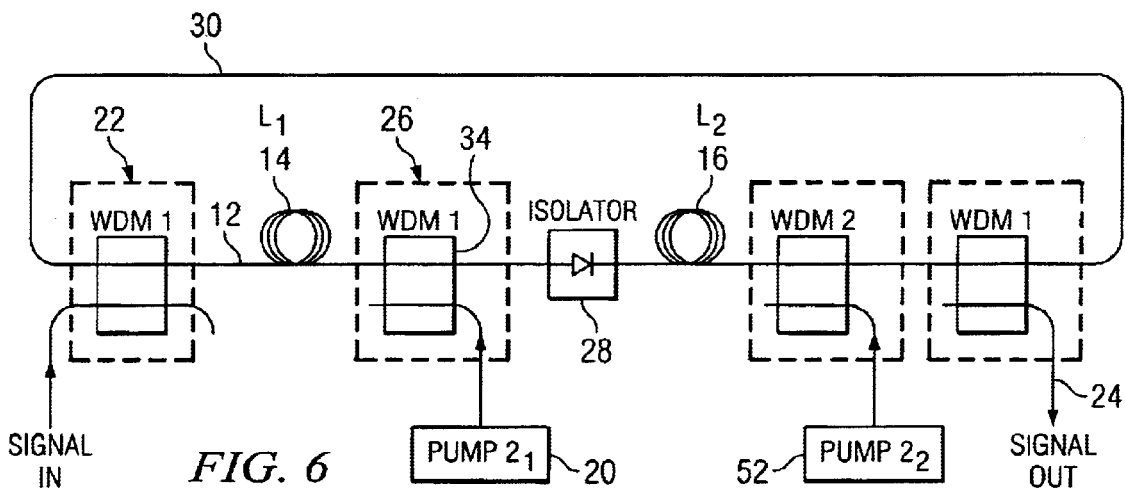
FIG. 6 is a schematic diagram of one embodiment of a multi-stage optical amplifier of the present invention that includes a pump shunt and two pump sources.

In another embodiment of multi-stage optical amplifier 10, multiple pump sources are utilized. In FIG. 6, pump source 20 is positioned between first amplifier fiber 14 and first lossy member 28. A second pump source 52 is positioned between second amplifier fiber 16 and signal output port 24 and is coupled to a second pump input port 54. First pump source 20 produces a pump beam of wavelength $\lambda_{p1}$ and second pump source 52 produces 52 a pump beam of wavelength $\lambda_{p2}$. Wavelength $\lambda_{p1}$ and wavelength $\lambda_{p2}$ can be the same or different. Pump sources 20 and 52 collectively produce a pump beam of wavelength $\lambda_p$. Pump wavelength $\lambda_p$ is less than a signal wavelength $\lambda_s$.

Figure 7:
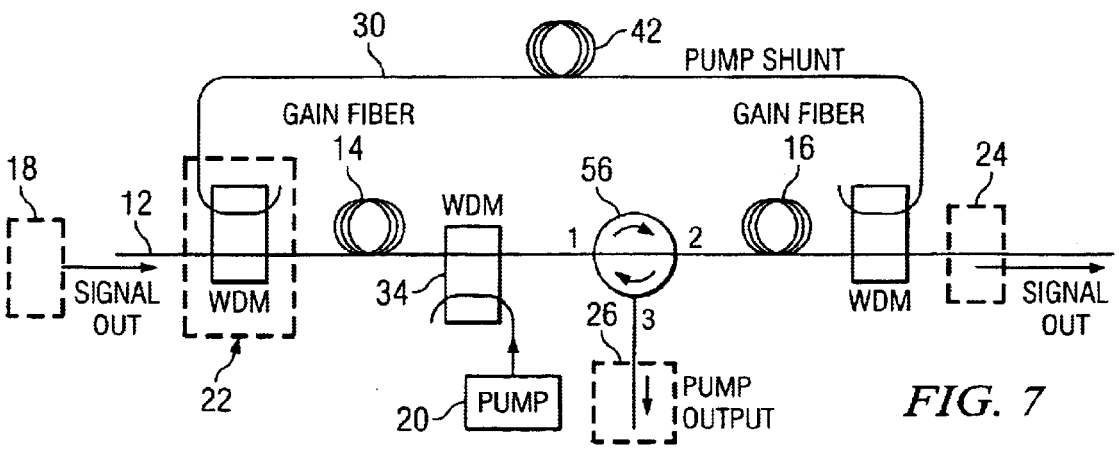
FIG. 7 is a schematic diagram of one embodiment of a multi-stage optical amplifier of the present invention that includes a pump shunt and a circulator.

In another embodiment, illustrated in FIG. 7, multi-stage amplifier 10 includes one or more circulators 56 to provide isolation between the first and second amplifier fibers 14 and 16. Circulator 56 also is useful as a means of dumping the remaining pump which can be reused elsewhere for monitoring purposes.

Figure 8A:
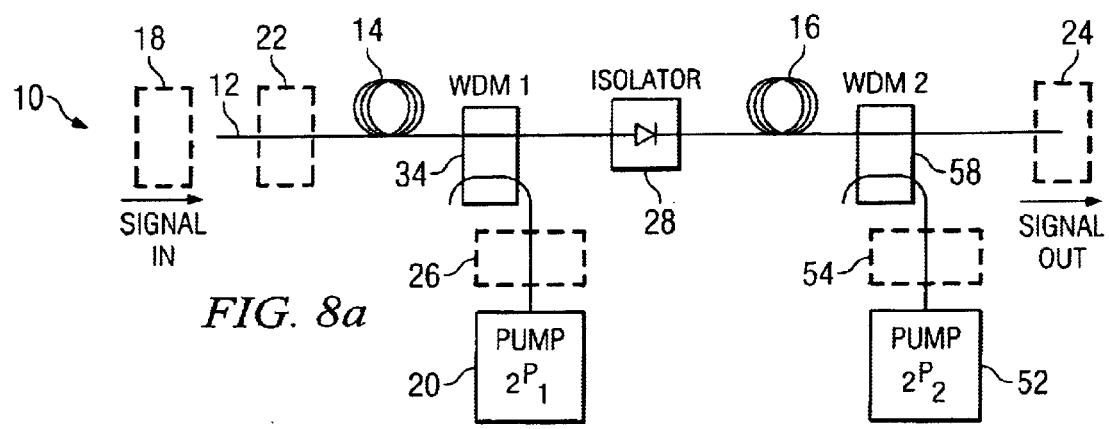
FIG. 8(a) is a schematic diagram of another embodiment of a multi-stage optical amplifier of the present invention that includes two Raman amplifier fibers and two pump sources.

As illustrated in FIG. 8(a), multi-stage optical amplifier 10 can have an open loop configuration, In this embodiment, optical fiber 12 is pumped by a pump beam generated by pump sources 20 and 52 and first and second amplifier fibers 14 and 16 are each Raman amplifiers. Optical fiber 12 is preferably single spatial mode at both the signal and pump wavelengths. Again, wavelength $\lambda_{p1}$ and wavelength $\lambda_{p2}$ can be the same or different. The pump beam has a wavelength shorter than the signal wavelengths. Pump sources 20 and 52 collectively produce a pump beam of wavelength $\lambda_p$. An amplified signal is then output through signal output port 24 Pump sources 20 and 52 are coupled in through WDM couplers 34 and 58 which transmit signal wavelength $\lambda_s$ but couple over the pump wavelength $\lambda_p$. First lossy member 28 is positioned between pump input port 26 and signal output port 24. In this embodiment, the signal flows in a first direction and the pump beam flows in a reverse direction relative to the first direction. First and second amplifier fibers 14 and 16 are pumped in a counter-propagating manner. It may also be desirous to have bi-directional pumping in second amplifier fiber 16 to increase the power amplifier gain without severely impacting the noise figure of multi-stage optical amplifier 10. Other elements, including but not limited dispersion compensating element 33, gain equalization element and add/drop multiplexer 31 may be included and positioned between first and second amplifier fibers 14 and 16.

Figure 8B:
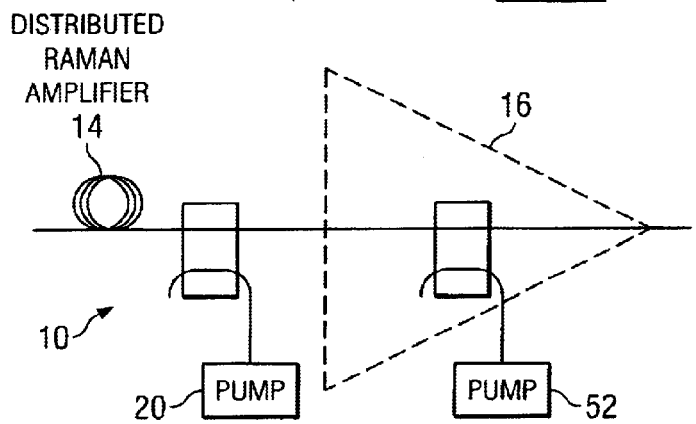
FIG. 8(b) is a schematic diagram of an embodiment of the present invention with a discrete and a distributed amplifier; where distributed amplification is added with only counter-propagating Raman pumps.
Figure 8C:
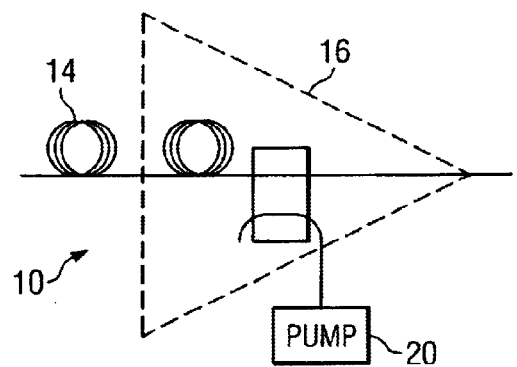
FIG. 8(c) is a schematic diagram of an embodiment of the present invention similar to FIG. 8(b) in which mid-span access is not available but bi-directional pumping is allowed.

In another embodiment, illustrated in FIGS. 8(b)–8(c), first amplifier fiber 14 is a distributed Raman amplifier fiber and second amplifier fiber 16 is a discrete Raman amplifier fiber. A distributed Raman amplifier fiber is an amplifier where at least some part of the transmission link is pumped and involved in amplification. In this embodiment, first lossy member 28 is not positioned between first and second amplifier fibers 14 and 16. In FIG. 8(b) distributed amplification is added with only counter-propagating Raman pumps. When access at a mid-point stage exists alternate band pumps are added at different spatial points to minimize nonlinear interaction between pumps. In FIG. 8(c) mid-span access is not available but bi-directional pumping is allowed. The embodiment of FIG. 8(c) can be used where alternate band Raman pumps are launched in different directions in order to minimize interaction between pumps.

Figure 9:
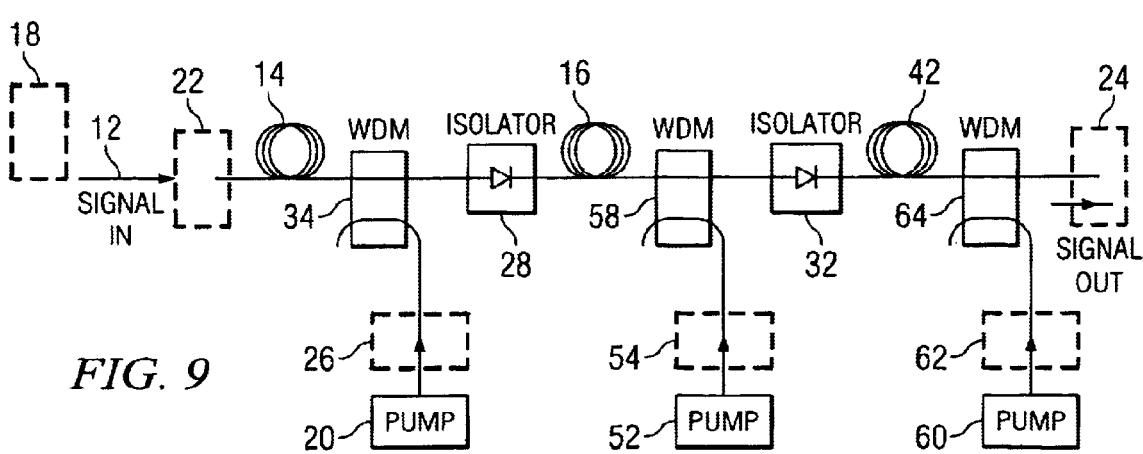
FIG. 9 is a schematic diagram of another embodiment of a multi-stage optical amplifier of the present invention that includes three Raman amplifier fibers and three pump sources.

The open loop embodiment of multi-stage optical amplifier 10 can have three or more amplifier fibers. Referring now to FIG. 9, an embodiment of multi-stage optical amplifier 10 is illustrated with third amplifier fiber 42 coupled to a third pump source 60 which is turn is coupled to a third pump input port 62. WDM coupler 64 is coupled to third pump input port 62. Some or all of first, second and third pump sources 20, 52 and 60 can be laser diode sources. Pump source 60 produces a pump beam of wavelength $\lambda_{p3}$. Wavelengths $\lambda_{p1}$, $\lambda_{p2}$ and $\lambda_{p3}$ can be the same or different. Pump sources 20, 52 and 60 collectively produce pump beam of wavelength $\lambda_p$. An amplified signal is then output through signal output port 24.

Figure 10:
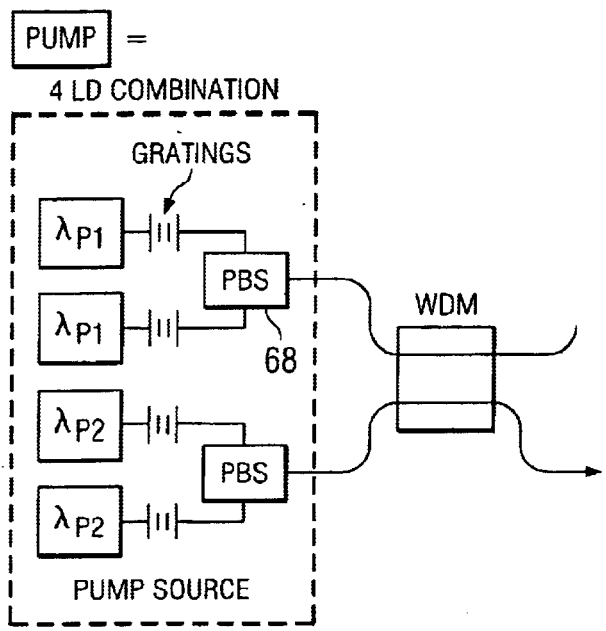
FIG. 10 is a schematic diagram illustrating four pump sources whose outputs are combined using wavelength and polarization multiplexing.
Figure 11:
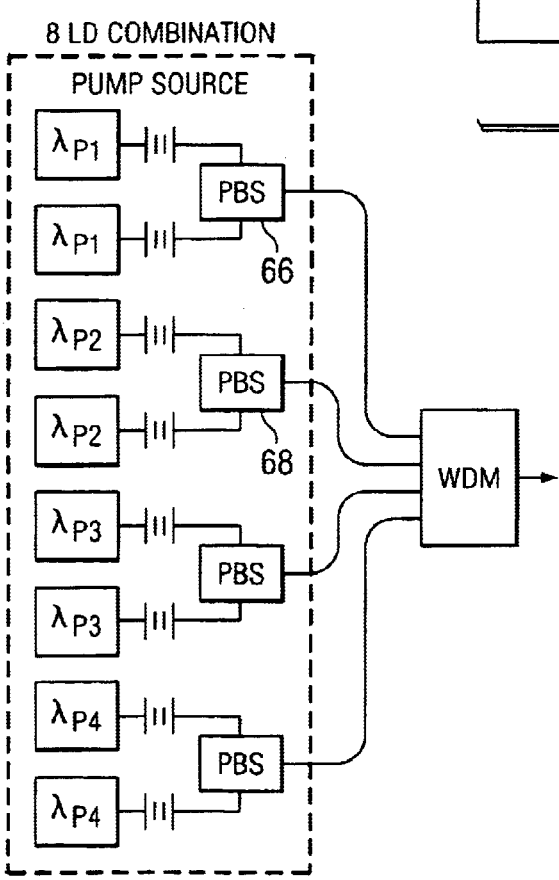
FIG. 11 is a schematic diagram illustrating eight pump sources whose outputs are combined using wavelength and polarization multiplexing.

As illustrated in FIGS. 10 and 11 each of pump source 20, 52 and 60 can include multiple pump sources whose outputs can be combined using wavelength and polarization multiplexing. Multiple combination gratings 66 and PBS's 68 can be utilized. Additionally, some or all of the multiple pump sources which comprise pump sources 20, 52 and 60 can be laser diodes. Brillouin scattering is a relatively strong but low-bandwidth non-linear optical interaction occurring between counter-propagating pump and signal beams and involving acoustical phonons in a material the pump and signal propagate through. Brillouin scattering of pump energy in a Raman gain fiber is a potential problem with any low-bandwidth high-powered pump source. This problem can be particularly acute, however, for laser diode pump sources whose small cavity dimensions can lead to lasing on a small number of low-bandwidth modes. Significant Brillouin scattering can lead to serious Raman amplifier noise problems, especially for designs intended to be strictly counter-propagating.

Figure 12:
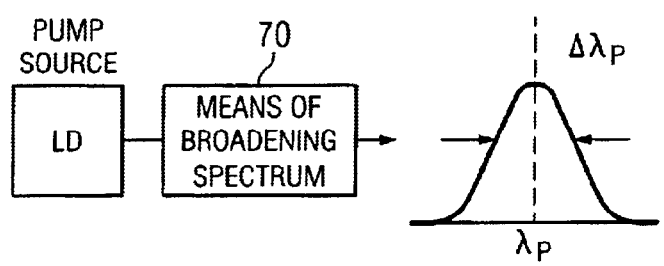
FIG. 12 is a schematic diagram illustrating that Brillouin threshold for a laser diode pump source can be minimized with the inclusion of a spectrum broadening device.

Referring now to FIG. 12, a spectrum broadening device 70 can be coupled to each pump source 20, 52 and 60. Spectrum broadening device 70 broadens the pump output spectrum and thus reduces Brillouin scattering. Suitable spectrum broadening devices 70 include but are not limited to, (i) a grating that is sufficiently broadband that can be chirped and cascade individual wavelengths, (ii) a grating positioned in a laser diode external cavity to cause appropriate line broadening, (iii) a laser diode pump driver that produces a dithering drive current, and (iv) a phase modulator driven by a broadband signal source. Additionally, pump pulsing can be used to broaden the spectrum.

For the purpose of the present invention, a DMRA is a Raman amplifier where the gain fiber is combined at least in part with a dispersion compensating element. The gain fiber can also serve the purpose of at least partially balancing the dispersion of the transmission fiber. In one embodiment, the Raman amplifier can be implemented using at least a segment of dispersion compensating fiber, where the sign of dispersion of the DCF is opposite to that of at least a portion of the transmission fiber for at least a portion of the amplifier gain bandwidth.

In various embodiments of the present invention, dispersion mapping and/or dispersion compensating elements are inserted periodically in a transmission line to undo accumulated dispersion. In one specific embodiment, a DMRA is utilized and the periodicity of the dispersion compensation coincides with the periodicity of the amplifier spacing. For WDM systems, the accumulated dispersion returns to exactly zero for only one wavelength. This differing accumulated dispersion for the WDM channels results from the nonzero slope of the dispersion curve. This can be avoided if the dispersion compensating element has the opposite sign of dispersion slope (not just opposite sign of dispersion) from the transmission fiber. In another embodiment, the accumulated dispersion for the channels away from the balance wavelength can be compensated for with the opposite dispersion at the receiver.

Figure 13A:
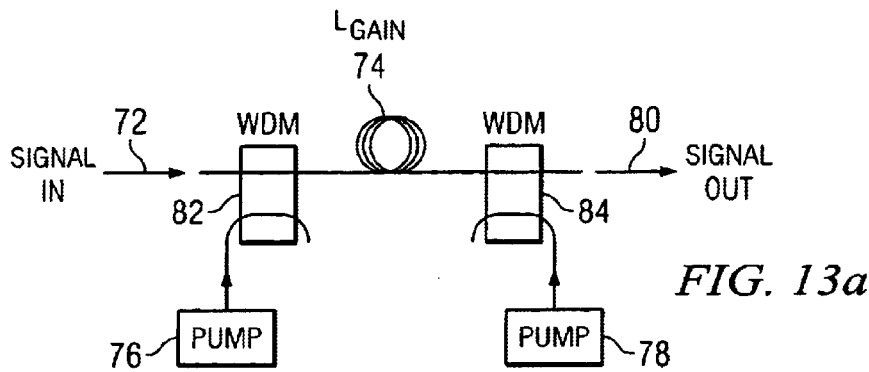
FIG. 13(a) is a schematic view of an open loop configuration for a dispersion managing Raman amplifier (DMRA) of the present invention with a bi-directionally pumped gain fiber.
Figure 13B:
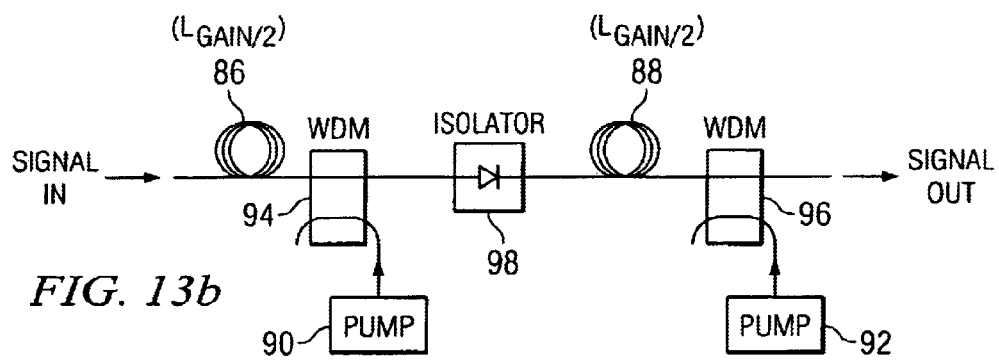
FIG. 13(b) is a schematic view of an open loop configuration for a DMRA of the present invention with the gain fiber split in two parts and counter-propagation of the pump and signal
Figure 13C:
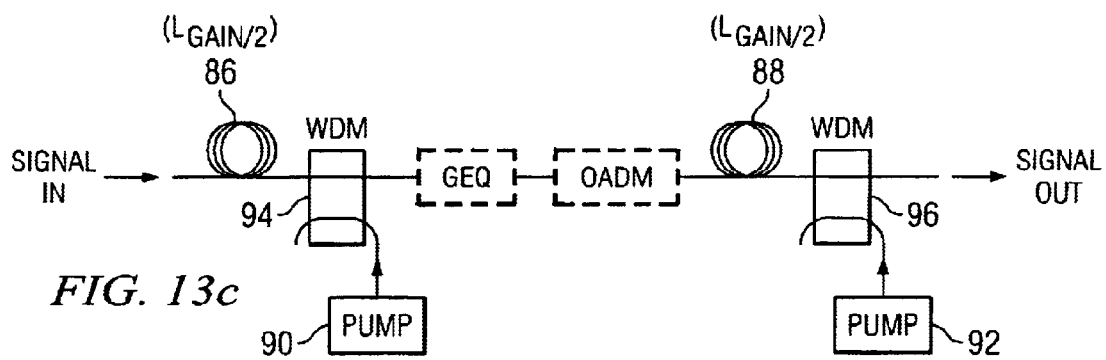
FIG. 13(c) is a schematic view of an open loop configuration for a DMRA of the present invention with other elements, such as gain equalization filters or optical add/drop multiplexers that are placed between two gain fibers.
Figure 13D:
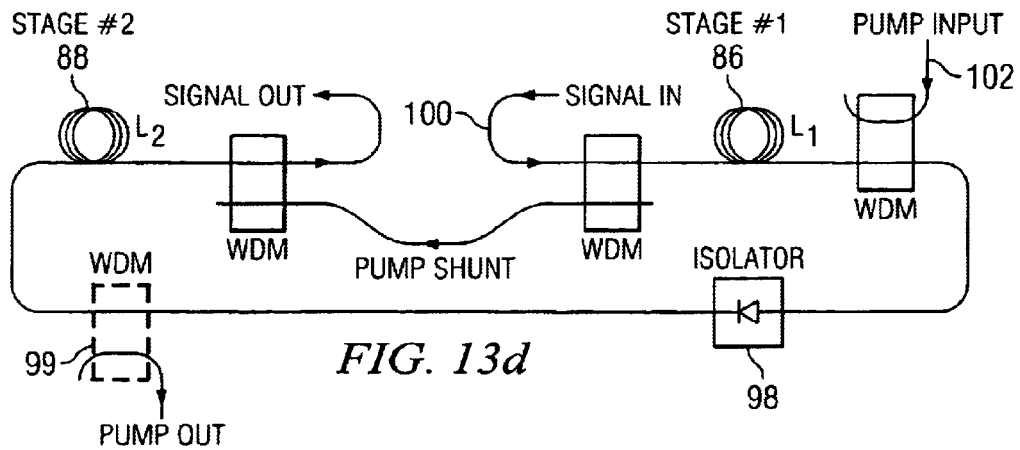
FIG. 13(d) is a schematic view of an open loop configuration for a DMRA of the present invention that is a two-stage amplifier, where the pump is inserted counter-propagating into the first stage and then after exiting the first stage is inserted counter-propagating into the second stage of the amplifier.
Figure 13E:
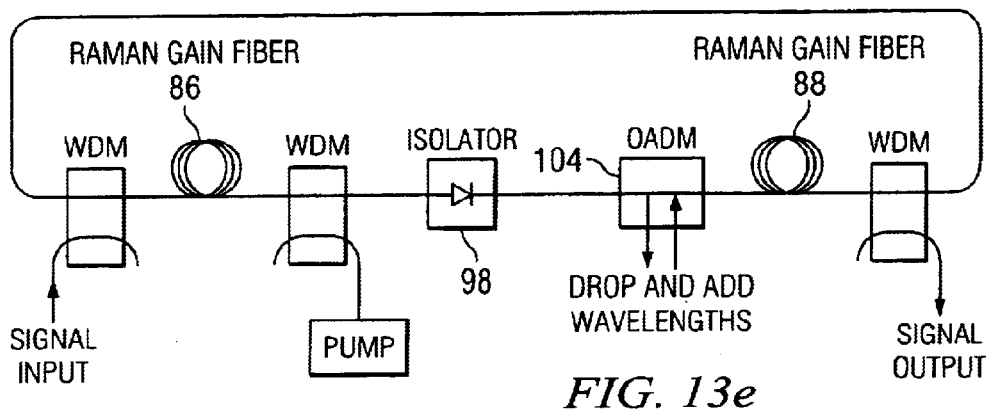
FIG. 13(e) is a schematic view of an open loop configuration for a DMRA of the present invention that is similar to the FIG. 13(d) embodiment but with one or more additional mid-stage elements such as an optical add/drop multiplexer.
Figure 13F:
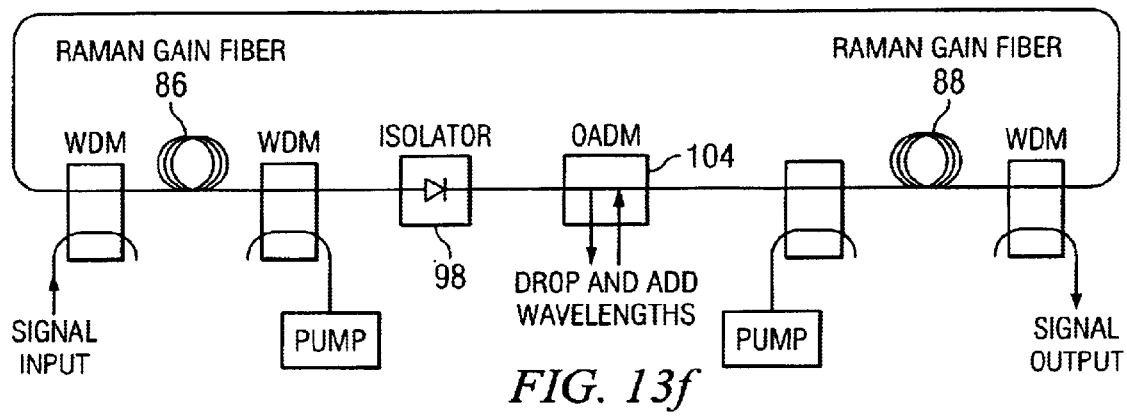
FIG. 13(f) is a schematic view of an open loop configuration for a DMRA of the present invention that is similar to the FIG. 13(e) embodiment but with bi-directional pumping in the second stage to boost the power gain without severe degradation in noise figure for the composite amplifier
Figure 14A:
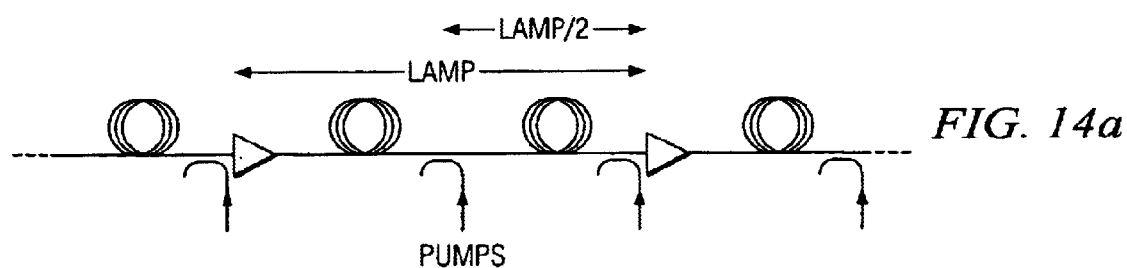
FIG. 14(a) is a schematic diagram of a hybrid system embodiment of the present invention with discrete amplifiers and distributed amplifiers that are configured for counter-propagating pumping and mid-span access.
Figure 14B:
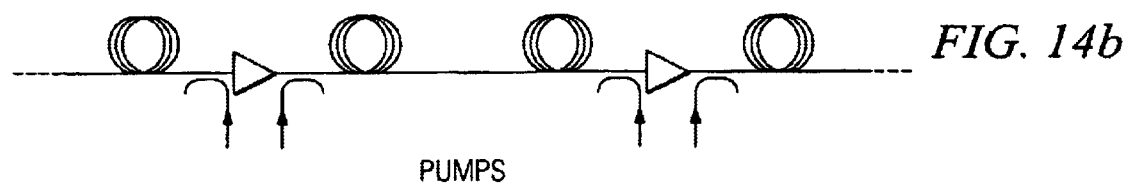
FIG. 14(b) is a schematic diagram of a hybrid system embodiment of the present invention with discrete amplifiers and distributed amplifiers configured for bi-directional pumping but not mid-span access.
Figure 14C:
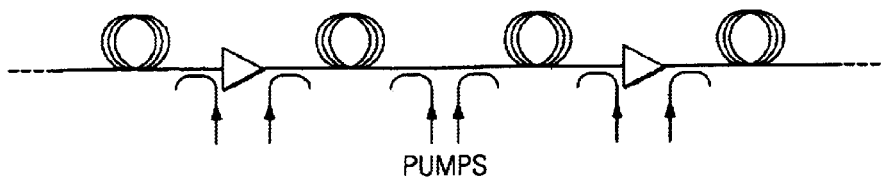
FIG. 14(c) is a schematic diagram of a hybrid system embodiment of the present invention with discrete amplifiers and distributed amplifiers configured for bi-directional pumping and mid-span access.
Figure 14D:
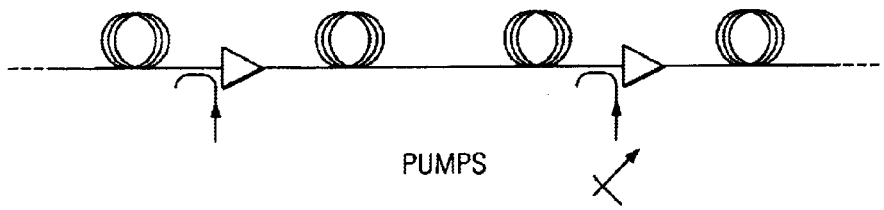
FIG. 14(d) is a schematic diagram of a hybrid system embodiment of the present invention with discrete amplifiers and distributed amplifiers that are configured for counter-propagating pumping and no mid-span access.
Figure 15A:
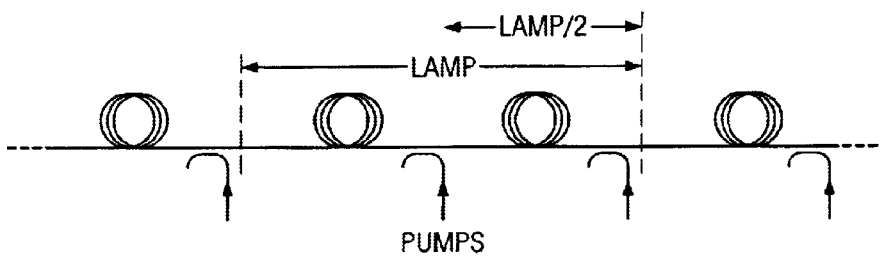
FIG. 15(a) is a schematic diagram of an embodiment of the present invention with distributed Raman amplifiers that are configured for counter-propagating pumping and mid-span access.
Figure 15B:
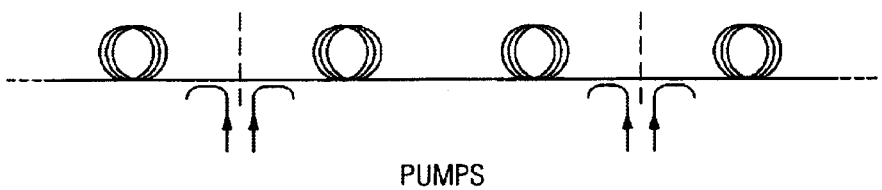
FIG. 15(b) is a schematic diagram of an embodiment of the present invention with distributed Raman amplifiers that are configured for bi-directional pumping and no mid-span access.
Figure 15C:
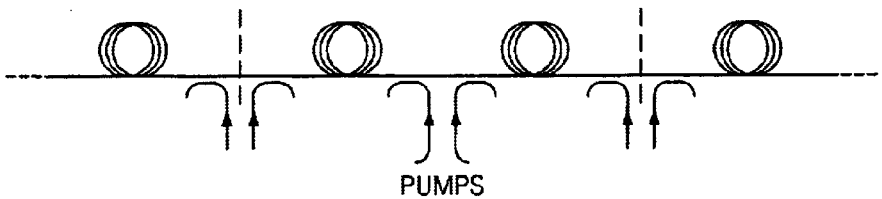
FIG. 15(c) is a schematic diagram of an embodiment of the present invention with distributed Raman amplifiers that are configured for bi-directional pumping and mid-span access.
Figure 15D:
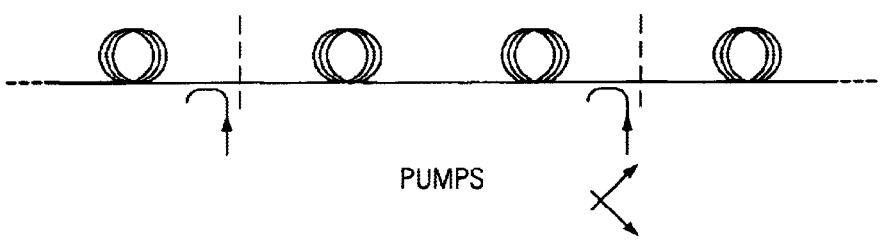
FIG. 15(d) is a schematic diagram of an embodiment of the present invention with distributed Raman amplifiers that are configured for counter-propagating pumping and no mid-span access.

FIG. 13(a) illustrates an embodiment of the invention which uses an open-loop dispersion managing Raman amplifier design. The open-loop design is the simplest DMRA, although it may have a high pump power requirement. In the DMRA amplifier of FIG. 13(*a*), an optical signal is input from an input port 72 to an optical amplifier fiber 74. Optical amplifier fiber 74 is pumped bi-directionally by light generated by pump sources 76 and 78. Optical amplifier fiber 74 preferably has only a single spatial mode at both the signal and pump wavelengths. The amplified signal is then output through an output port 80. Pump sources 76 and 78 are coupled in through wavelength-division multiplexers (WDM's) 82 and 84, which transmit the signal wavelength but couple over the pump wavelength.

To avoid coupling any pumping light fluctuations to the amplified signal, it can be desirable to have a strictly counter-propagating pump and signal geometry. The open loop configuration of FIG. 13(*b*) achieves this by splitting the amplifier fiber into first and second amplifier fibers 86 and 88. Pump sources 90 and 92 are used to pump first and second amplifier fibers 86 and 88, and WDM's 94 and 96 are used to couple the pump light into the amplifier fibers 86 and 88. In addition, an optical isolator 98 is placed between first and second amplifier fibers 86 and 88 to reduce double Rayleigh scattering in the amplifier and block the pump energy from pump source 92 that might otherwise enter amplifier fiber 86 through WDM 94.

Although FIG. 13(*b*) uses isolator 98 between first and second amplifier fibers 86 and 88, it will be appreciated that other elements can be used, including but not limited to a gain equalization element, an optical add/drop multiplexer, and the like. These other elements, and isolator 98, can be utilized individually or in any combination. FIG. 13(*c*) illustrates one embodiment of such a combination. Because of the typically high insertion loss associated with add/drop multiplexers, an effective isolation is achieved between first and second amplifier fibers 86 and 88 and thus an isolator is not used in this embodiment.

An alternate configuration for pumping the amplifier fiber is illustrated in FIG. 13(*d*). In this embodiment, light from a pump source is introduced into first amplifier fiber 86, the pump beam is shunted around where the signal is introduced and extracted from the amplifier, and then the pump light enters second amplifier fiber 88. An optional WDM 99 may be used to remove any remaining pump energy to avoid damage to isolator 98. Isolator 98 is placed between first and second amplifier fibers 86 and 88. This embodiment provides numerous advantages including but not limited to, first amplifier fiber 86 acts as a low-noise pre-amplifier that experiences high gain near a signal input port 100 due to its relative proximity to a pump input port 102. Isolator 98 in the signal path further reduces noise and multi-path interference (MPI) including double Rayleigh scattering, and second amplifier fiber 88 acts as a power amplifier that can deplete any remaining pump power without reducing the gain of the first amplifier fiber and thus the amplifier exhibits superior gain saturation performance Additionally, at the mid-stage of the two-stage amplifier other elements such as add/drop multiplexers and the like, can also be placed. For example, FIG. 13(*e*) illustrates the two-stage design of FIG. 13(*d*) along with an optical add/drop multiplexer 104 at the mid-stage. Further, the embodiments illustrated in FIGS. 13(*d*) and FIG. 13(*e*) are unique and advantageous even if dispersion compensation fiber is not used as the amplifier fiber. Furthermore, it may also be desirable to have bi-directional pumping in second amplifier fiber 88 in order to increase the power amplifier gain without severely impacting the noise figure of the composite amplifier. This is illustrated in FIG. 13(*f*).

FIGS. 14(*a*) through 14(*d*) illustrate various hybrid systems of the present invention that include discrete and distributed amplifiers. FIG. 14(*a*) illustrates one distributed amplification embodiment with only counter-propagating Raman pumps and having mid-span access. Different band pumps can be added at various spatial points to minimize non-linear interaction between pumps. If mid-span access is not available and bi-directional pumping is allowed, then the FIG. 14(*b*) embodiment can be used, where various band Raman pumps are launched in different directions to minimize interaction between pumps. If bi-directional pumping is allowed and mid-span access is also available, a more uniform pumping can be achieved using the FIG. 14(*c*) embodiment. Finally, if only counter-propagating pumps are allowed and there is no mid-span access, as in FIG. 14(*d*), then the various pump bands can be launched orthogonally polarized. This arrangement takes advantage of the fact that the Raman gain for cross-polarized light is about one-tenth the strength of Raman gain for co-polarized light. It will be appreciated that polarization multiplexing can also be combined advantageously with any of the embodiments of FIGS. 14(*a*)–14(*c*).

In other embodiments of the present invention, illustrated in FIGS. 15(*a*) through 15(*d*) only distributed Raman gain is used. FIGS. 15(*a*)–15(*d*) illustrate corresponding pumping configurations to those of FIGS. 14(*a*)–14(*d*) but use only distributed Raman amplification. FIG. 15(*a*) shows a purely counter-propagating pumping scheme where mid-span access exists. The different pump bands can be spatially dispersed. FIG. 15(*b*) illustrates a bi-directionally pumped situation with no mid-span access, where different pumps are launched in different directions. In the FIG. 15(*c*) embodiment, a combination of bi-directional pumping and mid-span access is utilized to make the gain more spatially uniform. FIG. 15(*d*) illustrates the launch of one or more cross-polarized pump bands. The cross-polarized pumps of the FIG. 15(*d*) embodiment can be advantageously combined with any of the embodiments illustrated in FIGS. 15(*a*)–15(*c*).

Figure 16:
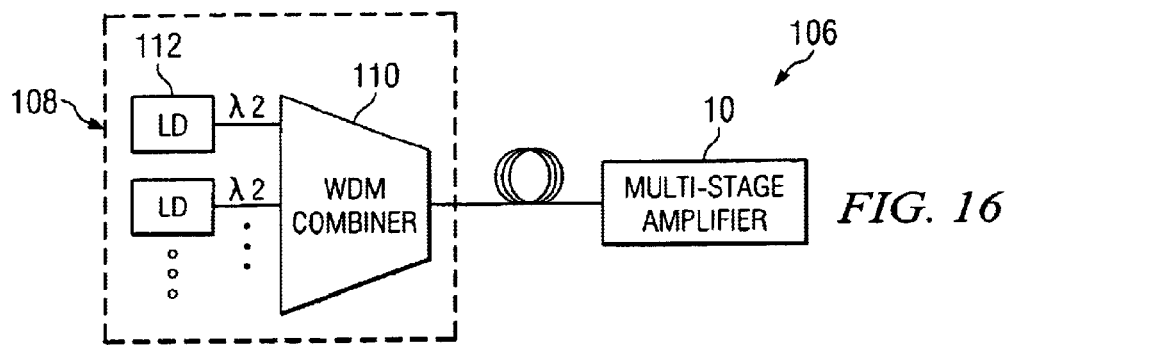
FIG. 16 is a schematic diagram of a broadband booster amplifier embodiment of the present invention.

Multi-stage optical amplifier 10 can be an in-line broadband amplifier, a booster amplifier, a broadband pre-amplifier and incorporated in any variety of different broadband communication systems. In another embodiment, illustrated in FIG. 16, the present invention is a broadband booster amplifier 106 that includes a multi-stage optical amplifier 10 coupled to a transmitter 108. Transmitter 108 can include a WDM combiner 110 and a plurality of transmitters 112. The plurality of transmitters 112 transmit a plurality of wavelengths. The plurality of wavelengths may include at least a first band of wavelengths and a second band of wavelengths. With the present invention, a variety of different transmitters 112 can be utilized including but not limited to laser diodes, tunable lasers, or broadband sources such as continuum sources or light-emitting diodes.

Figure 17:
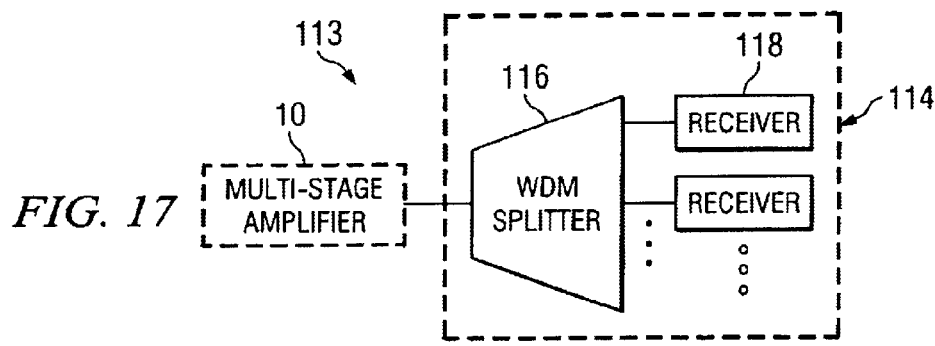
FIG. 17 is a schematic diagram of a broadband pre-amplifier embodiment of the present invention.

FIG. 17 illustrates a broadband pre-amplifier embodiment of the present invention. Broadband pre-amplifier 113 includes multi-stage optical amplifier 10 coupled to a receiver 114. Receiver 114 can include a WDM splitter 116 coupled to a plurality of receivers 118. Suitable receivers 118 include but are not limited to germanium or InGaAs or InGaAsP detectors followed by electronics well known to those skilled in the art.

Figure 18:
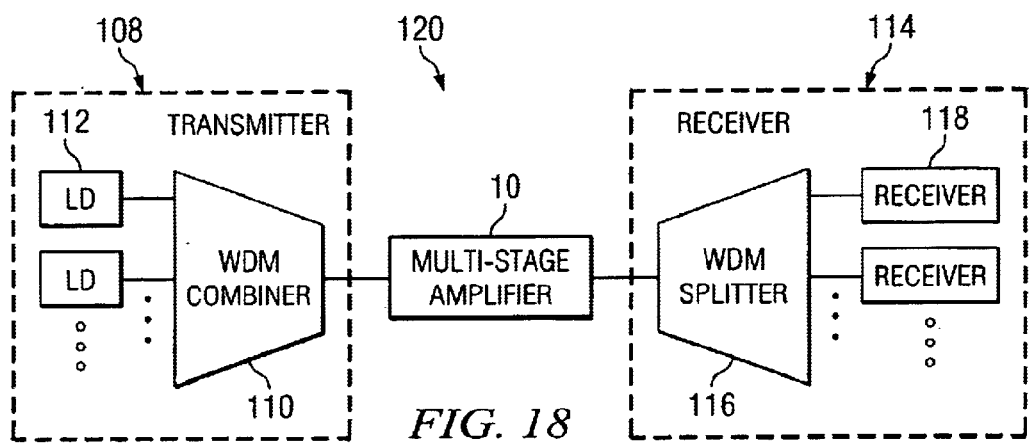
FIG. 18 is a schematic diagram of one embodiment of a broadband communication system of the present invention.

In another embodiment, illustrated in FIG. 18, the present invention is a broadband communication system 120. In this embodiment, multi-stage optical amplifier 10 is an in-line broadband amplifier. Multi-stage optical amplifier 10 is coupled to one or more transmitters 108 and one or more receivers 114.

Figure 19:
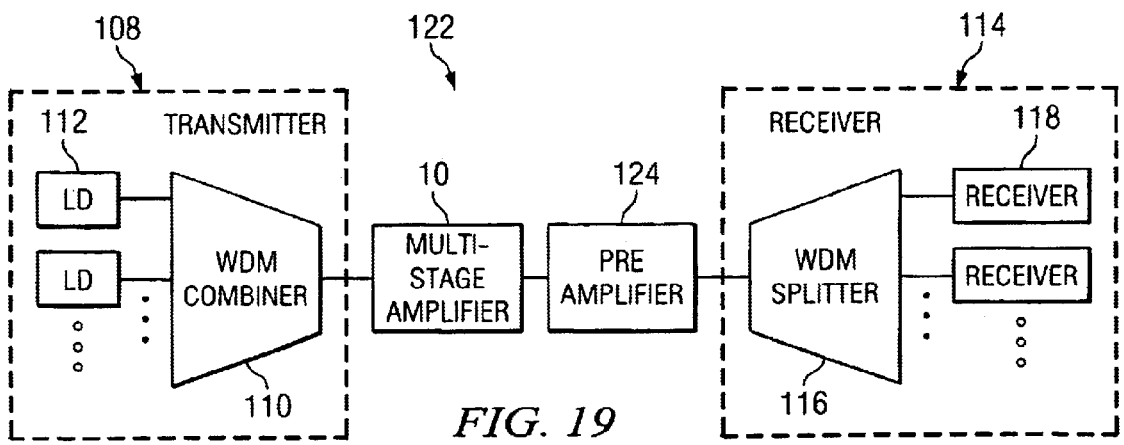
FIG. 19 is a schematic diagram of another embodiment of a broadband communication system of the present invention.

FIG. 19 illustrates another embodiment of the present invention which is a broadband communication system 122 that includes multi-stage optical amplifier 10 coupled to a broadband pre-amplifier 124. Multi-stage optical amplifier 10 is coupled to one or more transmitters 108 and broadband pre-amplifier 124 is coupled to one or more receivers 114.

Figure 20:
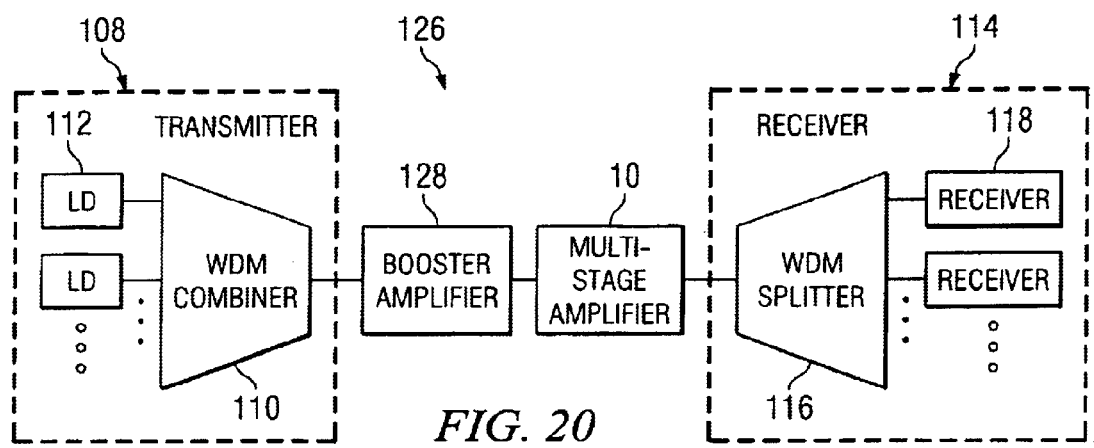
FIG. 20 is a schematic diagram of another embodiment of a broadband communication system of the present invention.

FIG. 20 illustrates yet another embodiment of a broadband communication system 126 with a broadband booster amplifier 128 coupled to multi-stage optical amplifier 10. One or more transmitters 108 are coupled to broadband booster amplifier 128. One or more receivers 114 are coupled to multi-stage optical amplifier 10.

Figure 21:
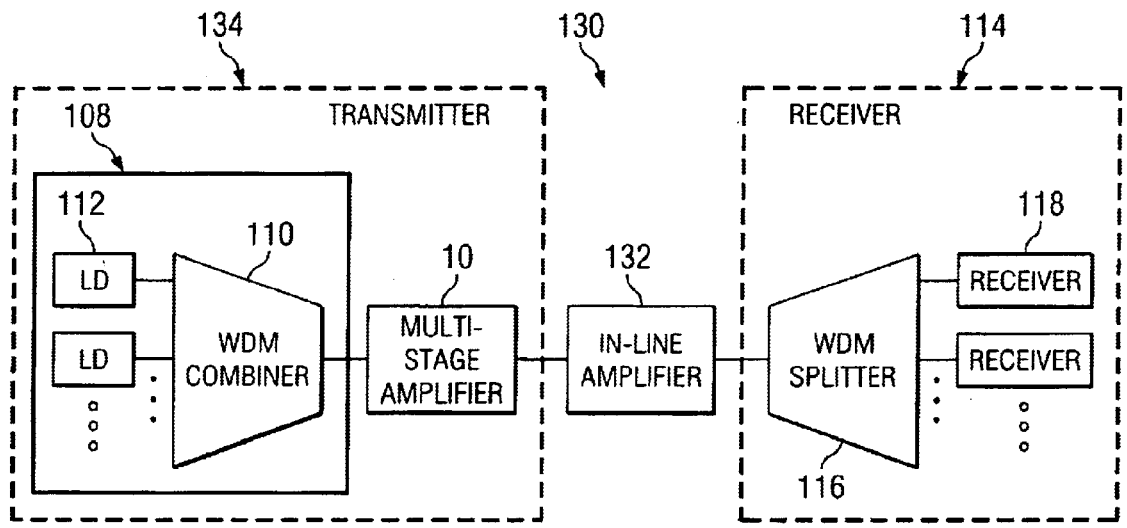
FIG. 21 is a schematic diagram of another embodiment of a broadband communication system of the present invention.

Another embodiment of a broadband communication system 130 is illustrated in FIG. 21. In this embodiment, an in-line amplifier 132 is coupled to receiver 114 and to a transmitter 134. Transmitter 134 includes multi-stage optical amplifier 10 coupled to transmitter 108.

Figure 22:
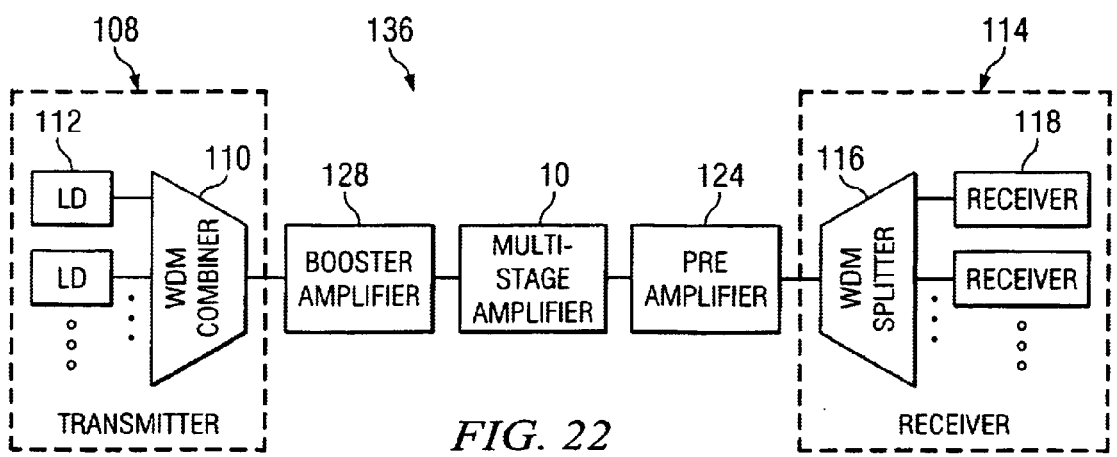
FIG. 22 is a schematic diagram of another embodiment of a broadband communication system of the present invention.

FIG. 22 illustrates another broadband communication system 136 of the present invention. Broadband communication system 136 includes multi-stage optical amplifier 10 coupled to broadband booster amplifier 128 and broadband pre-amplifier 124. Broadband booster amplifier 128 is coupled to one or more transmitters 108. Broadband pre-amplifier 124 is coupled to one or more receivers 114.

Figure 23A:
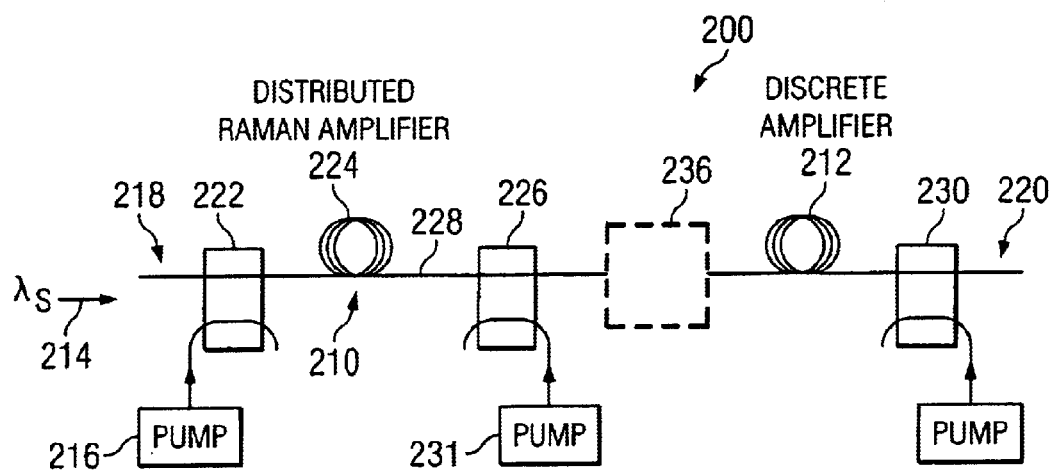
FIG. 23(a) is a schematic diagram of a multi-stage optical amplifier embodiment of the present invention with at least a distributed Raman amplifier fiber and a discrete amplifier fiber.

As illustrated in FIG. 23(a), a multi-stage optical amplifier 200 has at least a distributed Raman amplifier fiber 210 and a discrete amplifier fiber 212. Amplifier 200 is configured to be coupled to at least one signal source 214 that produces a plurality of signal wavelengths $\lambda_s$. At least a first pump source 216 produces one or more pump beam wavelengths $\lambda_p$. A signal input port 218 is coupled to amplifier 200. A signal output port 220 is coupled to amplifier 200. Distributed Raman and discrete amplifier fibers 210 and 212 are positioned between signal input port 218 and signal output port 220. A first pump input port 222 is coupled to a first end 224 of distributed Raman amplifier fiber 210. A second pump input port 226 is coupled to a second end 228 of distributed Raman amplifier fiber 210. First end 224 is located closer to signal input port 218 than second end 228. A third pump input port 230 is coupled to discrete amplifier fiber 212.

First and second pump input ports 222 and 226 are configured to couple pump light into distributed Raman amplifier fiber 210. Second and third pump input ports 226 and 230 can be located at a first location and first pump input port 222 is located at a second location that is distanced from the first location. The second location can be distanced in an amount of at least 20 km relative to the first location. Discrete amplifier fiber 212 can be a discrete Raman amplifier fiber.

First pump input port 222 is coupled to first pump source 216, and second pump input port 226 is coupled to a second pump source 231. In various embodiments, each of the first and second pump sources 216 and 231 can be a laser diode pump source. Distributed and discrete Raman amplifier fibers 210 and 212 can have lengths greater than or equal to 200 m. One or more pump beam wavelengths $\lambda_p$ can be in the range of 1300 nm to 1530 nm.

Distributed Raman amplifier fiber 210 can have an effective optical noise figure that is less than an optical noise figure of the discrete amplifier fiber 212 for at least a portion of the plurality of signal wavelengths $\lambda_s$. Discrete amplifier fiber 212 can have a higher gain than distributed Raman amplifier fiber 210 for at least a portion of the plurality of signal wavelengths $\lambda_s$.

Distributed and discrete Raman amplifier fibers 210 and 212 can each be dispersion compensating fibers. Distributed Raman amplifier fiber 210 can have an effective optical noise figure of less than 8 dB for at least a portion of the plurality of signal wavelengths $\lambda_s$. Discrete amplifier fiber 212 can have a gain level of at least 5 dB for at least a portion of the plurality of signal wavelengths $\lambda_s$.

Figure 23B:
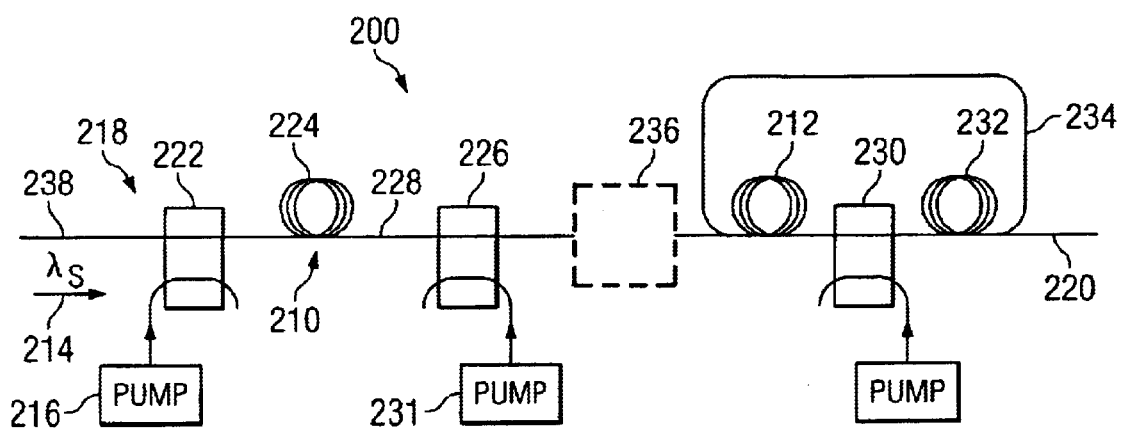
FIG. 23(b) is a schematic diagram of a multi-stage optical amplifier embodiment of the present invention that includes a second discrete Raman amplifier.

Referring now to FIG. 23(b), multi-stage optical amplifier 200 can include a second discrete Raman amplifier fiber 232. A pump shunt 234 can also be coupled to the optical fiber. When pump shunt 234 is included, at least a portion of the one or more pump wavelengths $\lambda_p$ is coupled between discrete Raman amplifier fiber 212 and second discrete Raman amplifier fiber 232. A first lossy member 236 can be positioned between signal input port 218 and signal output port 220. First lossy member 236 can be lossy in at least one direction. First lossy member 236 can include an optical isolator, an add/drop multiplexer, a gain equalization member, a dispersion compensation member, a WDM coupler and the like or any combination of such elements.

In one embodiment, multi-stage optical amplifier 200 includes a transmission fiber 238. Additionally, multi-stage optical amplifier 200 can also include dispersion compensating fiber The dispersion compensating fiber can have an opposite sign of dispersion slope and an opposite sign of dispersion relative to at least a portion of: transmission fiber 238 plus any portions of the distributed, discrete, and second discrete Raman amplifier fibers 210, 212, and 232 that are not comprised of dispersion compensating fiber.

Figure 23C:
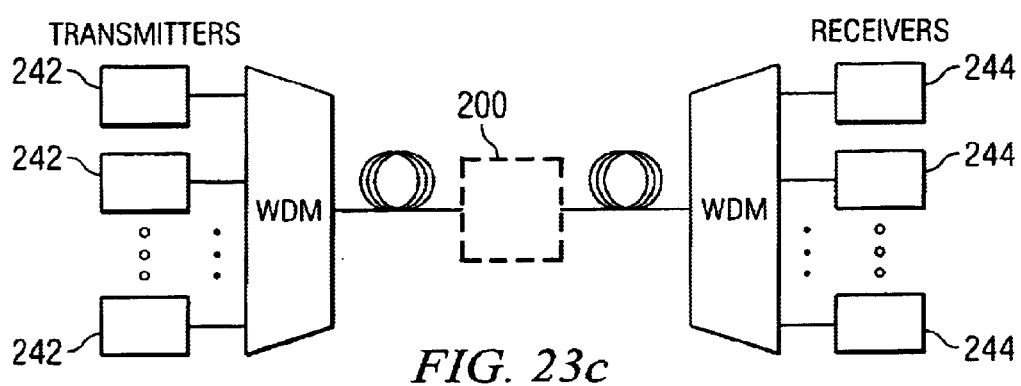
FIG. 23(c) is a schematic diagram of a multi-stage optical amplifier embodiment system of the present invention.

Multi-stage optical amplifier 200 can be included in a system, illustrated in FIG. 23(c). In this embodiment, a plurality of transmitters 242 and a plurality of receivers 244 are coupled to multi-stage optical amplifier 200.

Figure 24A:
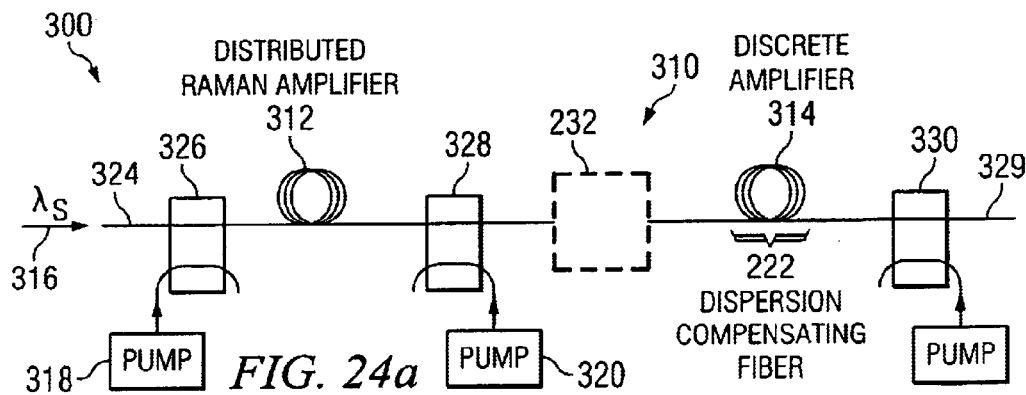
FIG. 24(a) is a schematic diagram of a multi-stage optical amplifier embodiment of the present invention that includes an optical fiber with a distributed Raman amplifier fiber and a discrete amplifier fiber.

In another embodiment of the present invention, illustrated in FIG. 24(a), a multi-stage optical amplifier 300 includes an optical fiber 310 with at least a distributed Raman amplifier fiber 312 and a discrete amplifier fiber 314. Optical fiber 310 is configured to be coupled to at least one signal source 316 that produces a plurality of signal wavelengths $\lambda_s$ and at least two pump sources 318 and 320 that produce one or more pump beam wavelengths $\lambda_p$. At least a portion of one of distributed Raman amplifier fiber 312 and discrete amplifier fiber 314 is a dispersion compensating fiber 322. A signal input port 324 is coupled to optical fiber 310.

A first pump input port is 326 positioned between signal input port 324 and distributed Raman amplifier fiber 312. A second pump input port 328 is included. Distributed Raman amplifier fiber 312 is positioned between signal input port 324 and second pump input port 328. Discrete amplifier fiber 314 is positioned between second pump input port 328 and signal output port 329. A third pump input port 330 is configured to pump discrete Raman amplifier fiber 314.

Dispersion compensating fiber 322 can have a zero dispersion point that is shifted to wavelengths greater than 1500 nm using the waveguide dispersion property. Dispersion compensating fiber 322 can have an opposite sign of dispersion slope and an opposite sign of dispersion relative to at least a portion of optical fiber 310. In one embodiment, dispersion compensating fiber 322 has an opposite sign of dispersion slope and an opposite sign of dispersion relative to a majority of optical fiber 310. In another embodiment, dispersion compensating fiber 322 has an opposite sign of dispersion slope and an opposite sign of dispersion relative to the cumulative dispersion of the entire non-dispersion compensating portion of optical fiber 310.

In one embodiment, discrete amplifier fiber 314 is a discrete Raman amplifier fiber. Distributed and discrete Raman amplifier fibers 312 and 314 can have lengths greater than or equal to 200 meters.

In one embodiment, the one or more pump beam wavelengths $\lambda_p$ are in the range of 1300 nm to 1530 nm. Distributed Raman amplifier fiber 312 can have an effective optical noise figure of less than 8 dB for at least a portion of the plurality of signal wavelengths $\lambda_S$. Discrete amplifier fiber 314 can have a gain level of at least 5 dB for at least a portion of the plurality of signal wavelengths $\lambda_S$.

Multi-stage optical amplifier 300 can also include a first lossy member 332 that can be positioned between signal input port 324 and signal output port 329. First lossy member 332 is lossy in at least one direction.

Figure 24B:
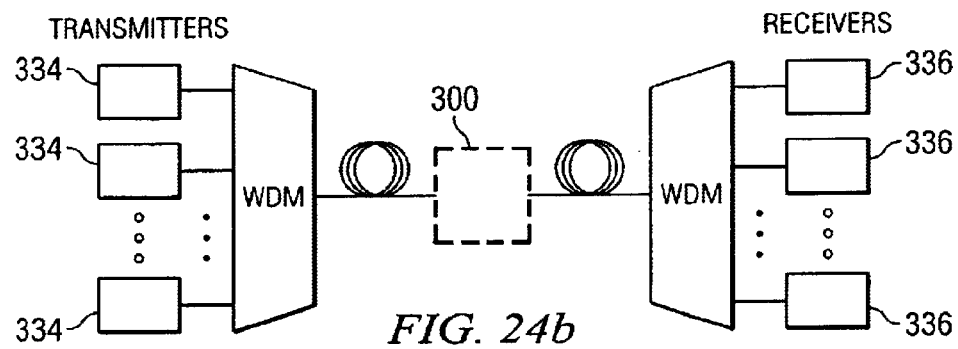
FIG. 24(b) illustrates a system that includes the FIG. 24(a) multi-stage optical amplifier.

Multi-stage optical amplifier 300 can be included in a system, illustrated in FIG. 24(b). In this embodiment, a plurality of transmitters 334 and a plurality of receivers 336 are coupled to multi-stage optical amplifier 300.

Figure 25A:
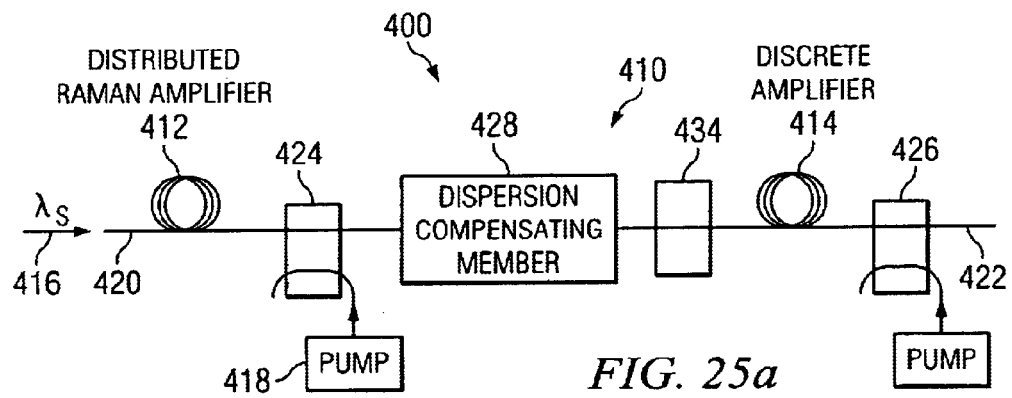
FIG. 25(a) is a schematic diagram of a multi-stage optical amplifier embodiment of the present invention with that is configured to be coupled to at least one signal source and at least one pump source 318.

Referring now to FIG. 25(a), a multi-stage optical amplifier 400 includes an optical fiber 410 with at least a distributed Raman amplifier fiber 412 and a discrete amplifier fiber 414. Multi stage optical amplifier 400 is configured to be coupled to at least one signal source 416 that produces a plurality of signal wavelengths $\lambda_s$; and at least a first pump source 418 that produces one or more pump beam wavelengths $\lambda_p$. First pump source can be a laser diode pump source. The one or more pump beam wavelengths $\lambda_p$ can be in the range of 1300 nm to 1530 nm.

A signal input port 420 is coupled to optical fiber 410. A signal output port 422 is coupled to optical fiber 410. Distributed Raman and discrete amplifier fibers 412 and 414 are positioned between signal input port 420 and signal output port 422. A first pump input port 424 is coupled to distributed Raman amplifier fiber 412. A second pump input port 426 is coupled to discrete amplifier fiber 414. A dispersion compensating member 428 is coupled to optical fiber 410. Dispersion compensating member 428 has an opposite sign of dispersion slope and an opposite sign of dispersion relative to at least a portion of optical fiber 410.

Dispersion compensating member 428 can be positioned between distributed Raman amplifier fiber 412 and discrete amplifier fiber 414. A portion of optical fiber 410 can be the dispersion compensating member 428. Additionally, at least a portion of optical fiber 410 can include a dispersion compensating fiber.

Dispersion compensating member 428 can have an opposite sign of dispersion slope and an opposite sign of dispersion relative to a majority of optical fiber 410. In another embodiment, dispersion compensating member 428 can have an opposite sign of dispersion slope and an opposite sign of dispersion relative to a cumulative dispersion of the entire optical fiber 410.

Discrete amplifier fiber 414 can be a discrete Raman amplifier fiber. Distributed and discrete Raman amplifier fibers 412 and 414 can have lengths greater than or equal to 200 meters. In one embodiment at least one of the distributed and discrete Raman amplifier fibers 412 and 414 is a dispersion compensating fiber.

Figure 25B:
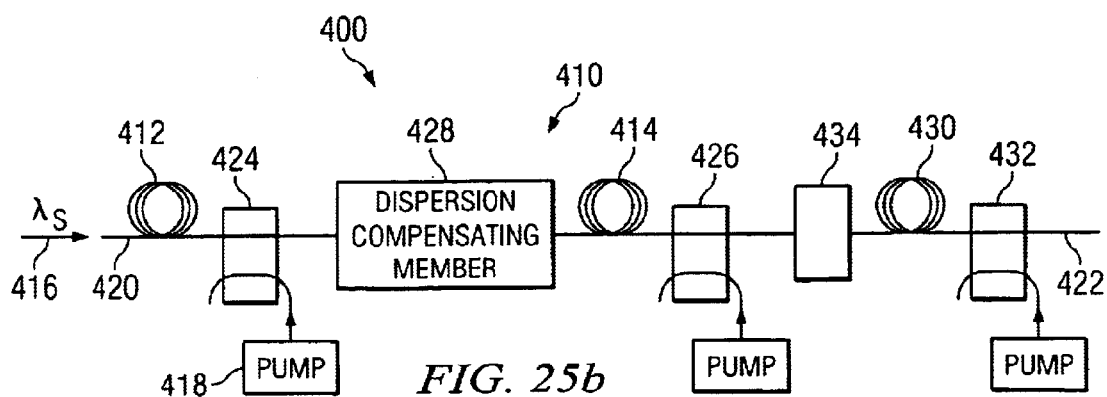
FIG. 25(b) is a schematic diagram of the FIG. 25(a) multi-stage optical amplifier with a second discrete Raman amplifier fiber.

As illustrated in FIG. 25(b), optical fiber 410 can include a second discrete Raman amplifier fiber 430. Multi-stage optical amplifier 400 can include a third pump input port 432 that is coupled to second discrete Raman amplifier fiber 430. Multi-stage optical amplifier 400 can also include a first lossy member 434 positioned between signal input port 420 and the signal output port 422. First lossy member 434 is lossy in at least one direction.

Figure 25C:
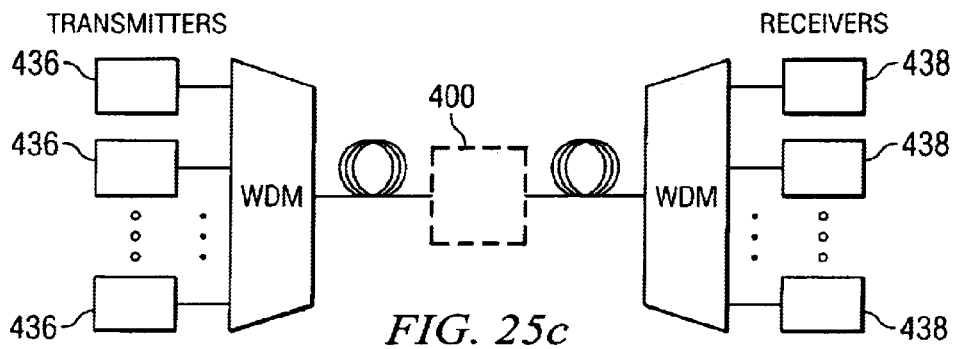
FIG. 25(c) is a schematic diagram of a system that includes the FIG. 25(a) multi-stage optical amplifier.

Referring to FIG. 25(c), multi-stage optical amplifier 400 can be included in a system. In this embodiment, a plurality of transmitters 436 and a plurality of receivers 438 are coupled to multi-stage optical amplifier 400.

Figure 26A:
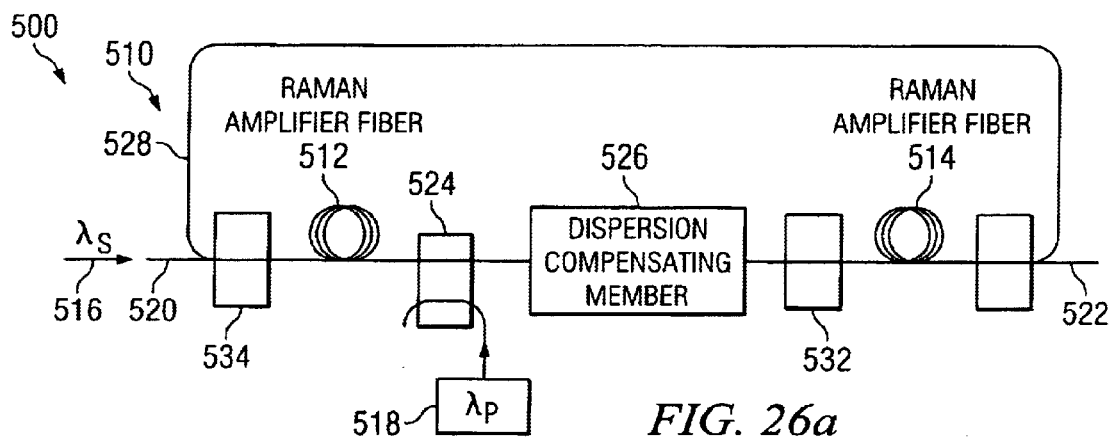
FIG. 26(a) illustrates another embodiment of a multi-stage optical amplifier of the present invention that includes a dispersion compensating member and a pump shunt.

FIG. 26(a) illustrates another embodiment of a multi-stage optical amplifier 500 of the present invention. An optical fiber 510 includes first and second Raman amplifier fibers 512 and 514. Optical fiber 510 is configured to be coupled to a signal source 516 that produces a plurality of signal wavelengths $\lambda_s$ and a pump source 518 that produces one or more pump wavelengths $\lambda_p$. The one or more pump wavelengths $\lambda_p$ are less than at least a portion of the plurality of signal wavelengths $\lambda_s$. The one or more pump wavelengths $\lambda_p$ can be in the range of 1300 to 1530 nm A signal input port 520, signal output port 522 and a pump input port 524 are all coupled to optical fiber 510. A dispersion compensating member 526 and a pump shunt 528 are each coupled to optical fiber 510. At least a portion of the one or more pump wavelengths $\lambda_p$ are coupled between the first Raman amplifier fiber 512 and the second Raman amplifier fiber 514.

In one embodiment, optical fiber 510 includes a transmission fiber and dispersion compensating member 526 has an opposite sign of dispersion slope and an opposite sign of dispersion relative to at least a portion of optical fiber 510. In another embodiment, optical fiber 510 includes a transmission fiber and dispersion compensating member 526 has an opposite sign of dispersion slope and an opposite sign of dispersion relative to a majority of optical fiber 510. Dispersion compensating member 526 can also have an opposite sign of dispersion slope and an opposite sign of dispersion relative to a cumulative dispersion of the entire optical fiber 510.

Figure 26B:
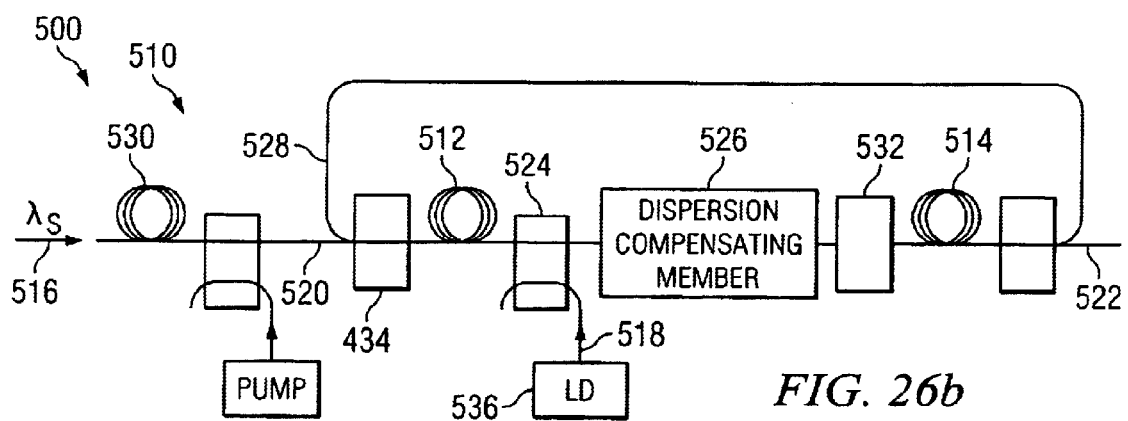
FIG. 26(b), illustrates another embodiment of a multi-stage optical amplifier of the present invention with at least a portion of a pump shunt positioned between a distributed Raman amplifier and a signal input port.

Referring now to FIG. 26(b), a pump shunt 528, which may be an optical fiber, can be coupled to signal input port 520 and signal output port 522. In one embodiment, a distributed Raman amplifier 530 is coupled to signal input port 520. At least a portion of pump shunt 528 can be positioned between distributed Raman amplifier 530 and the signal input port 520.

A first lossy member 532 can be coupled to optical fiber 510. In one embodiment, first lossy member 532 is coupled to pump shunt 528.

In one embodiment, at least a portion of the first and/or second Raman amplifier fibers 512 and 514 is a dispersion compensating fiber. The dispersion compensating fiber can have an opposite sign of dispersion slope and an opposite sign of dispersion relative to at least a portion of optical fiber 510 where the optical fiber 510 includes a transmission fiber.

Multi-stage optical amplifier 500 can also include at least one WDM coupler 534 to couple a pump path from signal input port 520 to signal output port 522. Pump source 518 can include at least one laser diode pump source 536 and can be coupled to pump input port 524.

Figure 26C:
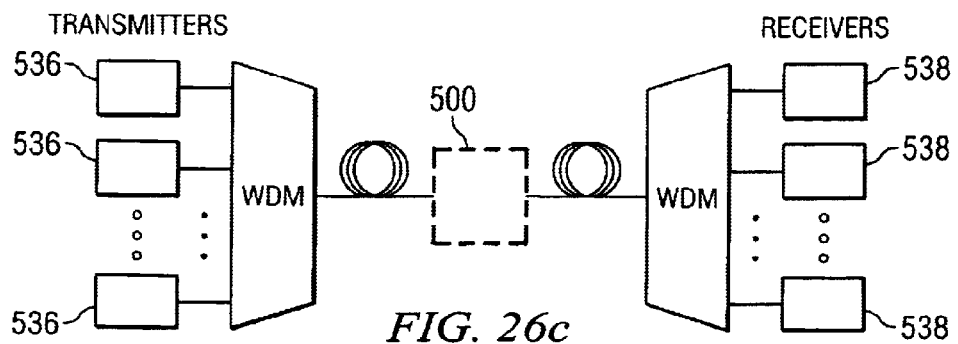
FIG. 26(c) is a schematic diagram of a system that includes the FIG. 26(a) multi-stage optical amplifier.

As illustrated in FIG. 26(c), multi-stage optical amplifier 500 can be included in a system. In this embodiment, a plurality of transmitters 536 and a plurality of receivers 538 are coupled to multi-stage optical amplifier 500.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-stage optical amplifier, comprising:
   an amplifier including at least a distributed Raman amplifier fiber and a discrete amplifier fiber, the amplifier configured to be coupled to at least one signal source that produces a plurality of signal wavelengths $\lambda_s$ and at least a first pump source that produces one or more pump beam wavelengths $\lambda_p$;

a signal input port coupled to the amplifier;

a signal output port coupled to the amplifier, the distributed Raman and discrete amplifier fibers being positioned between the signal input port and the signal output port;

a first pump input port coupled to a first end of the distributed Raman amplifier fiber and operable to introduce a first pump signal to the distributed Raman amplifier fiber;

a second pump input port coupled to a second end of the distributed Raman amplifier fiber and operable to introduce a second pump signal to the distributed Raman amplifier fiber, the first end being located closer to the signal input port than the second end, wherein the first pump signal traverses the distributed Raman amplifier fiber in a first direction and the second pump signal traverses the distributed Raman amplifier in a direction counter to the first direction; and a third pump input port coupled to the discrete amplifier fiber.

2. The multi-stage optical amplifier of claim 1, wherein the second and third pump input ports are located at a first location and the first pump input port is located at a second location that is distanced from the first location.

3. The multi-stage optical amplifier of claim 2, wherein the second location is distanced in an amount of at least 20 km relative to the first location.

4. The multi-stage optical amplifier of claim 1, wherein the discrete amplifier fiber is a discrete Raman amplifier fiber.

5. The multi-stage optical amplifier of claim 1, wherein the first pump input port is coupled to a first pump source, and the second pump input port is coupled to a second pump source.

6. The multi-stage optical amplifier of claim 4, wherein the distributed and discrete Raman amplifier fibers have lengths greater than or equal to 200 m.

7. The multi-stage optical amplifier of claim 1, wherein the one or more pump beam wavelengths $\lambda_p$ are in the range of 1300 nm to 1530 nm.

8. The multi-stage optical amplifier of claim 1, wherein an effective optical noise figure of the distributed Raman amplifier fiber is less than an optical noise figure of the discrete amplifier fiber for at least a portion of the plurality of signal wavelengths $\lambda_s$.

9. The multi-stage optical amplifier of claim 1, wherein the discrete amplifier fiber has a higher gain than the distributed Raman amplifier fiber for at least a portion of the plurality of signal wavelengths $\lambda_s$.

10. The multi-stage optical amplifier of claim 4, wherein at least one of the distributed and discrete Raman amplifier fibers is a dispersion compensating fiber.

11. The multi-stage optical amplifier of claim 1, wherein the distributed Raman amplifier fiber has an effective optical noise figure of less than 8 dB for at least a portion of the plurality of signal wavelengths $\lambda_s$.

12. The multi-stage optical amplifier of claim 1, wherein the discrete amplifier has a gain level of at least 5 dB for at least a portion of the plurality of signal wavelengths $\lambda_s$.

13. The multi-stage optical amplifier of claim 4, wherein the amplifier includes a second discrete Raman amplifier fiber.

14. The multi-stage optical amplifier of claim 13, further comprising a pump shunt coupled to the optical fiber, wherein at least a portion of the one or more pump wavelengths $\lambda_p$ is coupled between the discrete Raman amplifier fiber and the second discrete Raman amplifier fiber.

15. The multi-stage optical amplifier of claim 5, wherein each of the first and second pump sources is a laser diode pump source.

16. The multi-stage optical amplifier of claim 1, further comprising at least a first lossy member positioned between the signal input port and signal output port, the at least first lossy member being lossy in at least one direction.

17. The multi-stage optical amplifier of claim 16, wherein the at least first lossy member includes an optical isolator.

18. The multi-stage optical amplifier of claim 16, wherein the at least first lossy member includes an add/drop multiplexer.

19. The multi-stage optical amplifier of claim 16, wherein the at least first lossy member includes a gain equalization member.

20. The multi-stage optical amplifier of claim 16, wherein the at least first lossy member includes a dispersion compensation member.

21. The multi-stage optical amplifier of claim 16, wherein the at least first lossy member includes a WDM coupler.

22. The multi-stage optical amplifier of claim 4, wherein the amplifier includes a transmission fiber.

23. The multi-stage optical amplifier of claim 22, wherein the amplifier includes a dispersion compensating fiber.

24. The multi-stage optical amplifier of claim 23, wherein the dispersion compensating fiber has an opposite sign of dispersion slope and an opposite sign of dispersion relative to the transmission fiber.

25. The multi-stage optical amplifier of claim 22, wherein the transmission fiber includes the distributed and discrete Raman amplifier fibers.

26. The multi-stage optical amplifier of claim 25, wherein the amplifier includes a dispersion compensating fiber.

27. The multi-stage optical amplifier of claim 26, wherein the dispersion compensating fiber has an opposite sign of dispersion slope and an opposite sign of dispersion relative to the cumulative dispersion of the entire transmission fiber excluding any dispersion compensating fiber portion of the transmission fiber.

28. A multi-stage optical amplifier, comprising:

an optical fiber including at least a distributed Raman amplifier fiber and a discrete amplifier fiber, the optical fiber configured to be coupled to at least one signal source that produces a plurality of signal wavelengths $\lambda_s$ and at least two pump sources that produce one or more pump beam wavelengths $\lambda_p$, wherein at least a portion of one of the distributed Raman amplifier fiber and the discrete amplifier fiber is a dispersion compensating fiber;

a signal input port coupled to the optical fiber;

a first pump input port positioned between the signal input port and the distributed Raman amplifier fiber, the first pump input port operable to introduce a first pump signal to the distributed Raman amplifier fiber;

a second pump input port operable to introduce a second pump signal to the distributed Raman amplifier fiber, the distributed Raman amplifier fiber being positioned between the signal input port and the second pump input port and the discrete amplifier fiber being positioned between the second pump input port and signal output port, wherein the first pump signal traverses the distributed Raman amplifier fiber in a first direction and the second pump signal traverses the distributed Raman amplifier in a direction counter to the first direction; and a third pump input port configured to pump the discrete Raman amplifier fiber.

29. The multi-stage optical amplifier of claim 28, wherein the dispersion compensating fiber has a zero dispersion point that is shifted to wavelengths greater than 1500 nm using the waveguide dispersion property.

30. The multi-stage optical amplifier of claim 28, wherein the discrete amplifier fiber is a discrete Raman amplifier fiber.

31. The multi-stage optical amplifier of claim 28, wherein the distributed and discrete Raman amplifier have lengths greater than or equal to 200 m.

32. The multi-stage optical amplifier of claim 28, wherein the one or more pump beam wavelengths $\lambda_p$ are in the range of 1300 nm to 1530 nm.

33. The multi-stage optical amplifier of claim 28, wherein the distributed Raman amplifier fiber has an effective optical noise figure of less than 8 dB for at least a portion of the plurality of signal wavelengths $\lambda_s$.

34. The multi-stage optical amplifier of claim 28, wherein the discrete amplifier fiber has a gain level of at least 5 dB for at least a portion of the plurality of signal wavelengths $\lambda_s$.

35. The multi-stage optical amplifier of claim 28, further comprising at least a first lossy member positioned between the signal input port and the signal output port, the at least first lossy member being lossy in at least one direction.

36. The multi-stage optical amplifier of claim 28, wherein the dispersion compensating fiber has an opposite sign of dispersion slope and an opposite sign of dispersion relative to the cumulative dispersion of the entire optical fiber excluding the dispersion compensating fiber portion of the optical fiber.

37. A multi-stage optical amplifier, comprising:
an optical fiber including at least a distributed Raman amplifier fiber and a discrete amplifier fiber, the amplifier configured to be coupled to at least one signal source that produces a plurality of signal wavelengths $\lambda_s$ and at least a first pump source that produces one or more pump beam wavelengths $\lambda_p$;
a signal input port coupled to the optical fiber;
a signal output port coupled to the optical fiber, the distributed Raman and discrete amplifier fibers being positioned between the signal input port and the signal output port;
a first pump input port coupled to the distributed Raman amplifier fiber;
a second pump input port coupled to the discrete amplifier fiber; and
a dispersion compensating member coupled to the optical fiber, wherein the dispersion compensating member has an opposite sign of dispersion slope and an opposite sign of dispersion relative to at least a portion of the optical fiber.

38. The multi-stage optical amplifier of claim 37, wherein the dispersion compensating member is positioned between the distributed Raman amplifier fiber and the discrete amplifier fiber.

39. The multi-stage optical amplifier of claim 37, wherein a portion of the optical fiber is the dispersion compensating member.

40. The multi-stage optical amplifier of claim 37, wherein at least a portion of the optical fiber includes a dispersion compensating fiber.

41. The multi-stage optical amplifier of claim 37, wherein the dispersion compensating member has an opposite signal of dispersion slope and an opposite signal of dispersion relative to a majority of the optical fiber.

42. The multi-stage optical amplifier of claim 37, wherein the dispersion compensating member has an opposite signal of dispersion slope and an opposite signal of dispersion relative to a cumulative dispersion of the entire optical fiber.

43. The multi-stage optical amplifier of claim 37, wherein the discrete amplifier fiber is a discrete Raman amplifier fiber.

44. The multi-stage optical amplifier of claim 43, wherein the distributed and discrete Raman amplifier fibers have lengths greater than or equal to 200 m.

45. The multi-stage optical amplifier of claim 37, wherein the one or more pump beam wavelengths $\lambda_p$ are in the range of 1300 nm to 1530 nm.

46. The multi-stage optical amplifier of claim 43, wherein at least one of the distributed and discrete Raman amplifier fibers is a dispersion compensating fiber.

47. The multi-stage optical amplifier of claim 43, wherein the optical fiber includes a second discrete Raman amplifier fiber.

48. The multi-stage optical amplifier of claim 47, further comprising a third pump input port coupled to the second discrete Raman amplifier fiber.

49. The multi-stage optical amplifier of claim 37, wherein the first pump source is a laser diode pump source.

50. The multi-stage optical amplifier of claim 37, further comprising at least a first lossy member positioned between the signal input port and the signal output port, the at least first lossy member being lossy in at least one direction.

51. A multi-stage optical amplifier, comprising:
an optical fiber including a first Raman amplifier fiber and a second Raman amplifier fiber, the optical fiber configured to be coupled to a signal source that produces a plurality of signal wavelengths $\lambda_s$ and a pump source that produces one or more pump wavelengths $\lambda_p$, wherein the one or more pump wavelengths $\lambda_p$ are less than at least a portion of the plurality of signal wavelengths $\lambda_s$;
a signal input port coupled to the optical fiber;
a signal output port coupled to the optical fiber;
a pump input port coupled to the optical fiber; and
a dispersion compensating member coupled to the optical fiber; and
a pump shunt coupled to the signal input port and the signal output port, wherein the pump shunt couples at least a portion of the one or more pump wavelengths $\lambda_p$ between the first Raman amplifier fiber and the second Raman amplifier fiber.

52. The multi-stage optical amplifier of claim 51, wherein the optical fiber includes a transmission fiber and the dispersion compensating member has an opposite sign of dispersion slope and an opposite sign of dispersion relative to at least a portion of the optical fiber.

53. The multi-stage optical amplifier of claim 51, wherein the optical fiber includes a transmission fiber and the dispersion compensating member has an opposite sign of dispersion slope and an opposite sign of dispersion relative to a majority of the optical fiber.

54. The multi-stage optical amplifier of claim 51, wherein the optical fiber includes a transmission fiber and the dispersion compensating member has an opposite sign of dispersion slope and an opposite sign of dispersion relative to a cumulative dispersion of the entire optical fiber.

55. The multi-stage optical amplifier of claim 51, further comprising a distributed Raman amplifier coupled to the signal input port.

56. The multi-stage optical amplifier of claim 55, wherein at least a portion of the pump shunt is positioned between the distributed Raman amplifier and the signal input port.

57. The multi-stage optical amplifier of claim 51, wherein the one or more pump wavelengths $\lambda_p$ are in the range of 1300 to 1530 nm.

58. The multi-stage optical amplifier of claim 51, further comprising a lossy member coupled to the optical fiber.

59. The multi-stage optical amplifier of claim 51, further comprising a lossy member coupled to the pump shunt.

60. The multi-stage optical amplifier of claim 51, wherein the pump shunt includes an optical fiber.

61. The multi-stage optical amplifier of claim 51, wherein at least a portion of at least one of the first and second Raman amplifier fibers is a dispersion compensating fiber.

62. The multi-stage optical amplifier of claim 61, wherein the optical fiber includes a transmission fiber and the dispersion compensating fiber has an opposite sign of dispersion slope and an opposite sign of dispersion relative to at least a portion of the optical fiber.

63. The multi-stage optical amplifier of claim 53, further comprising at least one WDM coupler to couple a pump path from the signal input port to the signal output port.

64. The multi-stage optical amplifier of claim 51, further comprising:
at least one laser diode pump source coupled to the pump input port.

65. A multi-stage optical amplifier system, comprising:
a plurality of transmitters that produce a plurality of signal wavelengths $\lambda_s$;
a multi-stage optical amplifier comprising:
at least a distributed Raman amplifier fiber and a discrete amplifier fiber, the multi-stage optical amplifier being coupled to the plurality of transmitters and configured to be coupled to at least a first pump source that produces one or more pump beam wavelengths $\lambda_p$;
a signal input port coupled to the amplifier,
a signal output port coupled to the amplifier, the distributed Raman and discrete amplifier fibers being positioned between the signal input port and the signal output port;
a first pump input port coupled to a first end of the distributed Raman amplifier fiber and operable to introduce a first pump signal to the distributed Raman amplifier fiber;
a second pump input port coupled to a second end of the distributed Raman amplifier fiber and operable to introduce a second pump signal to the distributed Raman amplifier fiber, the first end being located closer to the signal input port than the second end, wherein the first pump signal traverses the distributed Raman amplifier fiber in a first direction and the second pump signal traverses the distributed Raman amplifier in a direction counter to the first direction:
a third pump input port coupled to the discrete amplifier fiber; and
a plurality of receivers coupled to the multi-stage optical amplifier.

66. The multi-stage optical amplifier of claim 65, wherein the first and second pump input ports are configured to couple pump light into the distributed Raman amplifier fiber.

67. The multi-stage optical amplifier of claim 65, wherein the discrete amplifier fiber is a discrete Raman amplifier fiber.

68. The multi-stage optical amplifier of claim 67, wherein the distributed and discrete Raman amplifier fibers have lengths greater than or equal to 200 m.

69. The multi-stage optical amplifier of claim 67, wherein at least one of the distributed and discrete Raman amplifier fibers is a dispersion compensating fiber.

70. A multi-stage optical amplifier system, comprising:
a plurality of transmitters that produce a plurality of signal wavelengths $\lambda_s$;
a multi-stage optical amplifier comprising:
an optical fiber including at least a distributed Raman amplifier fiber and a discrete amplifier fiber, the multi-stage optical amplifier being coupled to the plurality of transmitters and configured to be coupled to at least two pump sources that produce one or more pump beam wavelengths $\lambda p$, wherein at least a portion of one of the distributed Raman amplifier fiber and the discrete amplifier fiber is a dispersion compensating fiber;
a signal input port coupled to the amplifier;
a first pump input port positioned between the signal input port and the distributed Raman amplifier fiber, the first pump input port operable to introduce a first pump signal to the distributed Raman amplifier fiber;
a second pump input port operable to introduce a second pump signal to the distributed Raman amplifier fiber, the distributed Raman amplifier fiber being positioned between the signal input port and the second pump input port and the discrete amplifier fiber being positioned between the second pump input port and signal input port, wherein the first pump signal traverses the distributed Raman amplifier fiber in a first direction and the second pump signal traverses the distributed Raman amplifier in a direction counter to the first direction;
a third pump input port configured to pump the discrete Raman amplifier fiber; and
a plurality of receivers coupled to the multi-stage optical amplifier.

71. The multi-stage optical amplifier of claim 70, wherein the dispersion compensating fiber has a zero dispersion point that is shifted to wavelengths greater than 1500 nm using the wavelength dispersion property.

72. The multi-stage optical amplifier of claim 70, wherein the discrete amplifier fiber is a discrete Raman amplifier fiber.

73. The multi-stage optical amplifier of claim 72, wherein the distributed and discrete Raman amplifier fibers have lengths greater than or equal to 200 m.

74. The multi-stage optical amplifier of claim 70, wherein the dispersion compensating fiber has an opposite sign of dispersion slope and an opposite sign of dispersion relative to the cumulative dispersion of the entire optical fiber excluding the dispersion compensating fiber portion of the optical fiber.

75. A multi-stage optical amplifier system, comprising:
a plurality of transmitters that produce a plurality of signal wavelengths $\lambda_s$;
a multi-stage optical amplifier including,
an optical fiber including at least a distributed Raman amplifier fiber and a discrete amplifier fiber, the multi-stage optical amplifier being coupled to the plurality of transmitters and configured to be coupled to at least a first pump source that produces one or more pump beam wavelengths $\lambda_p$;
a signal input port coupled to the optical fiber;

a signal output port coupled to the optical fiber, the distributed Raman and discrete amplifier fibers being positioned between the signal input port and the signal output port;

a first pump input port coupled to the distributed Raman amplifier fiber;

a second pump input port coupled to the discrete amplifier fiber;

a dispersion compensating member coupled to the optical fiber, wherein the dispersion compensating member has an opposite sign of dispersion slope and an opposite sign of dispersion relative to at least a portion of the optical fiber; and a plurality of receivers coupled to the multi-stage optical amplifier.

76. The multi-stage optical amplifier of claim 75, wherein the dispersion compensating member is positioned between the distributed Raman amplifier fiber and the discrete amplifier fiber.

77. The multi-stage optical amplifier of claim 75, wherein the dispersion compensating member has an opposite signal of dispersion slope and an opposite signal of dispersion relative to a majority of the optical fiber.

78. The multi-stage optical amplifier of claim 75, wherein the dispersion compensating member has an opposite signal of dispersion slope and an opposite signal of dispersion relative to a cumulative dispersion of the entire optical fiber.

79. The multi-stage optical amplifier of claim 75, wherein the discrete amplifier fiber is a discrete amplifier fiber.

80. A multi-stage optical amplifier system, comprising:

a plurality of transmitters that produce a plurality of signal wavelengths $\lambda_s$;

a multi-stage optical amplifier including, an optical fiber including a first Raman amplifier fiber and a second Raman amplifier fiber, the multi-stage optical amplifier being coupled to the plurality of transmitters and configured to be coupled to a pump source that produces one or more pump wavelengths $\lambda_p$, wherein the one or more pump wavelengths $\lambda_p$ are less than at least a portion of the plurality of signal wavelengths $\lambda_s$;

a signal input port coupled to the optical fiber;

a signal output port coupled to the optical fiber;

a pump input port coupled to the optical fiber;

a dispersion compensating member coupled to the optical fiber;

a pump shunt coupled to the signal input port and the signal output port, wherein the pump shunt couples at least a portion of the one or more pump wavelengths $\lambda_p$ between the first Raman amplifier fiber and the second Raman amplifier fiber; and a plurality of receivers coupled to the multi-stage optical amplifier.

81. The multi-stage optical amplifier of claim 80, wherein the optical fiber includes a transmission fiber and the dispersion compensating member has an opposite sign of dispersion slope and an opposite sign of dispersion relative to at least a portion of the optical fiber.

82. The multi-stage optical amplifier of claim 80, wherein the optical fiber includes a transmission fiber and the dispersion compensating member has an opposite sign of dispersion slope and an opposite sign of dispersion relative to a majority of the optical fiber.

83. The multi-stage optical amplifier of claim 80, wherein the optical fiber includes a transmission fiber and the dispersion compensating member has an opposite sign of dispersion slope and an opposite sign of dispersion relative to a cumulative dispersion of the entire optical fiber.

84. The multi-stage optical amplifier of claim 80, further comprising a distributed Raman amplifier coupled to the signal input port.

85. A multi-stage optical amplifier, comprising:

an amplifier including at least a distributed Raman amplifier fiber and a discrete amplifier fiber, the amplifier configured to be coupled to at least one signal source that produces a plurality of signal wavelengths $\lambda_s$ and at least a first pump source that produces one or more pump beam wavelengths $\lambda_p$;

a signal input port coupled to the amplifier;

a signal output port coupled to the amplifier, the distributed Raman and discrete amplifier fibers being positioned between the signal input port and the signal output port;

a first pump input port coupled to a first end of the distributed Raman amplifier fiber;

a second pump input port coupled to a second end of the distributed Reman amplifier fiber, the first end being located closer to the signal input port than the second end; and a third pump input port coupled to the discrete amplifier fiber.

86. The amplifier of claim 85, wherein the first and second pump input ports are configured to couple pump light into the distributed Reman amplifier fiber.

87. The amplifier of claim 85, wherein the discrete amplifier fiber is a discrete Reman amplifier fiber.

88. The amplifier of claim 85, wherein the first pump input port is coupled to a first pump source, and the second pump input port is coupled to a second pump source.

89. The amplifier of claim 85, wherein an effective optical noise figure of the distributed Raman amplifier fiber is less than an optical noise figure of the discrete amplifier fiber for at least a portion of the plurality of wavelengths $\lambda_s$.

90. The amplifier of claim 85, wherein at least one of the distributed and discrete Raman amplifier fibers is a dispersion compensating fiber.

91. The amplifier of claim 90, wherein the dispersion compensating fiber has an opposite sign of dispersion slope and an opposite sign of dispersion relative to a transmission fiber coupled to the amplifier.

92. The amplifier of claim 91, wherein the transmission fiber includes the distributed and discrete Raman amplifier fibers.

93. The amplifier of claim 85, wherein the amplifier further comprising:

a second discrete Raman amplifier fiber;

a pump shunt coupled to the amplifier, wherein at least a portion of the one or more pump wavelengths $\lambda_p$ is coupled between the discrete Raman amplifier fiber and the second discrete Raman amplifier fiber; and at least a first lossy member positioned between the signal input port and signal output port, the at least first lossy member being lossy in at least one direction.

94. A multi-stage optical amplifier, comprising:

an optical fiber including at least a distributed Raman amplifier fiber and a discrete amplifier fiber, the optical fiber configured to be coupled to at least one signal source that produces a plurality of signal wavelengths $\lambda_s$ and at least two pump sources that produce one or more pump beam wavelengths $\lambda_p$ wherein at least portion of one of the distributed Raman amplifier fiber and the discrete amplifier fiber is a dispersion compensating fiber;

a signal input port coupled to the optical fiber;

a first pump input port positioned between the signal input port and the distributed Raman amplifier fiber;

a second pump input port, the distributed Raman amplifier fiber being positioned between the signal input port and the second pump input port and the discrete amplifier fiber being positioned between the second pump input port and signal output port; and a third pump input port configured to pump the discrete Raman amplifier fiber.

95. A multi-stage optical amplifier, comprising:

an optical fiber including at least a distributed Raman amplifier fiber and a discrete amplifier fiber, the amplifier configured to be coupled to at least one signal source that produces a plurality of signal wavelengths $\lambda_s$ and at least a first pump source that produces one or more pump beam wavelengths $\lambda_p$;

a signal input port coupled to the optical fiber;

a signal output port coupled to the optical fiber, the distributed Raman and discrete amplifier fibers being positioned between the signal input port and the signal output port;

a first pump input port coupled to the distributed Raman amplifier fiber;

a second pump input port coupled to the discrete amplifier fiber; and a dispersion compensating member coupled to the optical fiber, wherein the dispersion compensating member has an opposite sign of dispersion slope and an opposite sign of dispersion relative to at least a portion of the optical fiber.

96. The amplifier of claim 95, wherein a portion of the optical fiber is the dispersion compensating member.

97. The amplifier of claim 95, wherein at least a portion of the optical fiber includes a dispersion compensating fiber.

98. The amplifier of claim 95, wherein the dispersion compensating member has an opposite sign of dispersion slope and an opposite sign of dispersion relative to a majority of the optical fiber.

99. The amplifier of claim 95, wherein the dispersion compensating member has an opposite sign of dispersion slope and an opposite sign of dispersion relative to a cumulative dispersion of the entire optical fiber.

100. The amplifier of claim 95, wherein the discrete amplifier fiber is a discrete Raman amplifier fiber.

101. The amplifier of claim 95, wherein the optical fiber includes a second discrete amplifier fiber.

102. The amplifier of claim 101, further comprising a third pump input port coupled to the second discrete Raman amplifier fiber.

* * * * *